United States Patent
Lu et al.

(10) Patent No.: US 10,025,301 B2
(45) Date of Patent: Jul. 17, 2018

(54) METHOD AND SYSTEM OF ADAPTIVE MODEL-BASED CONTROL FOR MULTIPLE-INPUT MULTIPLE-OUTPUT PLANTS

(71) Applicant: General Electric Company, Schenectady, NY (US)

(72) Inventors: Manxue Lu, Swampscott, MA (US); R. Sheldon Carpenter, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 418 days.

(21) Appl. No.: 14/814,541

(22) Filed: Jul. 31, 2015

(65) Prior Publication Data

US 2016/0062353 A1 Mar. 3, 2016

Related U.S. Application Data

(60) Provisional application No. 62/043,744, filed on Aug. 29, 2014.

(51) Int. Cl.
*G05B 13/04* (2006.01)
*G05B 19/418* (2006.01)

(52) U.S. Cl.
CPC ..... *G05B 19/41885* (2013.01); *G05B 13/041* (2013.01); *G05B 2219/49062* (2013.01)

(58) Field of Classification Search
CPC ............ G05B 19/41885; G05B 13/041; G05B 2219/49062
See application file for complete search history.

(56) References Cited

U.S. PATENT DOCUMENTS

| | | | |
|---|---|---|---|
| 6,094,601 A | 7/2000 | Popovich | |
| 6,823,675 B2 | 11/2004 | Brunell et al. | |
| 6,904,422 B2 | 6/2005 | Calise et al. | |
| 8,855,943 B1 * | 10/2014 | Matsui | G01M 5/0033 244/1 R |

(Continued)

FOREIGN PATENT DOCUMENTS

| | | |
|---|---|---|
| CN | 1490690 A | 4/2004 |
| CN | 101807048 A | 8/2010 |

(Continued)

OTHER PUBLICATIONS

An Application of Dynamic Inversion to Stabilization of a Triple Inverted Pendulum on a Cart. Article. [online]. Hakan Fer, 1996 [Retrieved on Nov. 13, 2017]. Retrieved from internet: <URL: http://ieeexplore.ieee.org/stamp/stamp.jsp?arnumber=558951>.*

(Continued)

*Primary Examiner* — Robert E Fennema
*Assistant Examiner* — Marzia T Monty
(74) *Attorney, Agent, or Firm* — General Electric Company; Pamela Kachur

(57) ABSTRACT

A method and system for controlling a plant having a plurality of actuators, a plurality of inputs corresponding to the operational state of the actuators and plurality of outputs corresponding to an operating condition of the plant according to a model-based control and a plant model. The plant model is on-line reconfigured and the model-based control is built such that the model-based control adapts to the reconfigured plant model.

17 Claims, 6 Drawing Sheets

(56) References Cited

U.S. PATENT DOCUMENTS

| | | | | |
|---|---|---|---|---|
| 2001/0032026 | A1 | 10/2001 | Shigemasa et al. | |
| 2005/0209713 | A1* | 9/2005 | Fuller | G05B 13/048 700/29 |
| 2007/0055392 | A1* | 3/2007 | D'Amato | G05B 13/048 700/44 |
| 2007/0168057 | A1* | 7/2007 | Blevins | G05B 13/022 700/53 |

FOREIGN PATENT DOCUMENTS

| | | |
|---|---|---|
| CN | 103229113 A | 7/2013 |
| EP | 2 175 332 A2 | 4/2010 |
| JP | 1109401 A | 4/1989 |
| JP | 6187004 A | 7/1994 |
| JP | 2001255903 A | 9/2001 |
| JP | 2008181202 A | 8/2008 |
| WO | 2007067645 A2 | 6/2007 |

OTHER PUBLICATIONS

McDonnell et al., "Predictive Functional Control of Multivariable System with More Outputs than Inputs" Proceedings of the 28th IEEE Conference on Decision and Control, Tampa, FL, vol. No. 2, pp. 1591-1596 Dec. 13-15, 1989.

European Search Report issued in connection with corresponding EP Application No. 15182311.9 dated Jan. 29, 2016.

Unofficial English Translation of Japanese office action issued in connection with corresponding JP Application No. 2015164355 dated Jul. 28, 2016.

Machine Translation and First Office Action and Search issued in connection with corresponding CN Application No. 201510549064.1 dated Jul. 17, 2017.

\* cited by examiner

# METHOD AND SYSTEM OF ADAPTIVE MODEL-BASED CONTROL FOR MULTIPLE-INPUT MULTIPLE-OUTPUT PLANTS

CROSS-REFERENCE TO RELATED APPLICATIONS

This non-provisional application claims the benefit of priority under 35 U.S.C. § 119(e) to U.S. Provisional Patent Application No. 62/043,744, entitled "METHOD AND SYSTEM OF ADAPTIVE MODEL-BASED CONTROL FOR MULTIPLE-INPUT MULTIPLE-OUTPUT PLANTS", filed Aug. 29, 2014, which is herein incorporated in its entirety by reference.

BACKGROUND

For multi-input multi-output (MIMO) plants, the model-based control system has more than one primary target to control in different operating conditions. In general, the multiple inputs are the control handles driven by the actuators. The model-based control system determines the input commands to multiple actuators in a plant in order to control multiple plant outputs to achieve multiple control objectives under different operating conditions. By way of example, a plant may be a jet engine wherein multiple actuators control the processes of the jet engine to produce outputs such as fan speed, pressure ratios, nozzle position or core temperature which correspond to multiple control objectives such as thrust, fan operability and/or core operability, and fuel consumption. Actuators in MIMO control system may be constrained for various reasons resulting in loss of a certain level of control effects or complete control effects on plant outputs. Model-based control performance is dependent on the plant model and if the plant model cannot capture certain plant dynamic changes included in or induced by the constrained actuator(s), then the model-based control resulting from the model may not control the plant with such changes properly or stably.

BRIEF DESCRIPTION OF THE INVENTION

In one aspect, an embodiment of the invention relates to a method of controlling a plant having a plurality of actuators, a plurality of inputs corresponding to the operational state of the actuators and a plurality of outputs corresponding to an operating condition of the plant according to a model-based control and a plant model. The outputs are prioritized to define an output priority ranking and the current mode of each of the plurality of actuators is determined to define a plurality of actuator modes. At least one plant model adaptive factor array is built using the output priority ranking and the actuator modes. The plant model is then reconfigured in real-time using the at least one plant model adaptive factor array to adapt the plant model to the output priority ranking and actuator modes. The model-based control is built such that the model-based control adapts to the output priority ranking and actuator modes automatically.

In another aspect, an embodiment of the invention relates a control system for a plant having a plurality of outputs corresponding to an operating condition of the plant and a plurality of actuators having a plurality of inputs corresponding to an operational state of the actuators. An output priority ranking module is configured to prioritize the plurality of outputs to determine an output priority ranking. An actuator mode management module is configured to determine the mode of each of the plurality of actuators to define a plurality of actuator modes. A management module is configured to build at least one plant model adaptive factor array using the output priority ranking and the actuator modes. A plant model module is configured to reconfigure a plant model using the at least one plant model adaptive factor array and a model-based control module is configured to build a model-based control that adapts to the output priority ranking and actuator modes automatically.

BRIEF DESCRIPTION OF THE DRAWINGS

The technology described herein may be best understood by reference to the following description taken in conjunction with the accompanying drawing figures in which.

DETAILED DESCRIPTION

Figure 1:
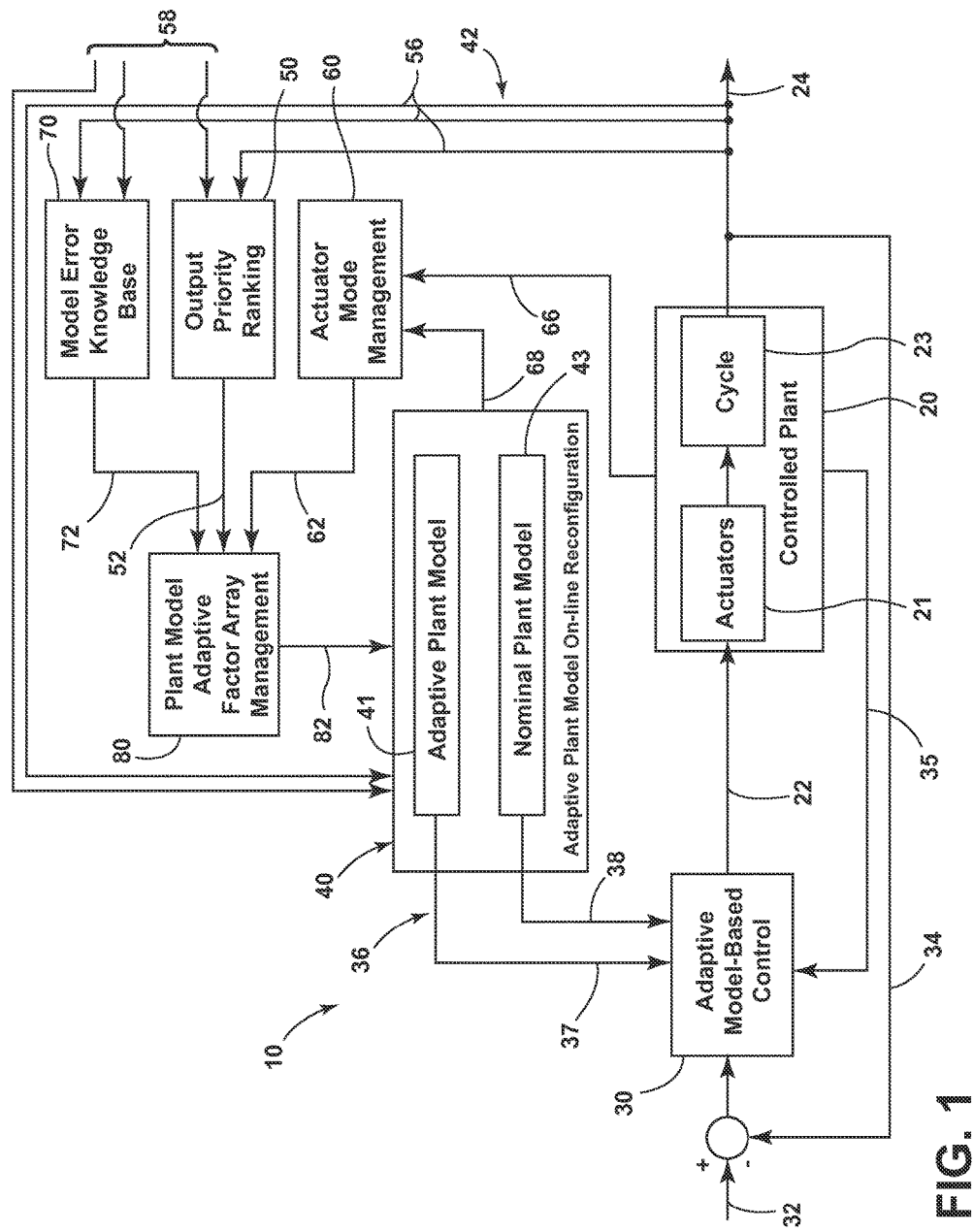
FIG. 1 is a block diagram representation of a model-based control system according to an embodiment of the invention.

In the background and the following description, for the purposes of explanation, numerous specific details are set forth in order to provide a thorough understanding of the technology described herein. It will be evident to one skilled in the art, however, that the exemplary embodiments may be practiced without these specific details. In other instances, structures and device are shown in diagram form in order to facilitate description of the exemplary embodiments.

The exemplary embodiments are described with reference to the drawings. These drawings illustrate certain details of specific embodiments that implement a module, method, or computer program product described herein. However, the drawings should not be construed as imposing any limitations that may be present in the drawings. The method and computer program product may be provided on any machine-readable media for accomplishing their operations. The embodiments may be implemented using an existing computer processor, or by a special purpose computer processor incorporated for this or another purpose, or by a hardwired system.

As noted above, embodiments described herein may include a computer program product comprising machine-readable media for carrying or having machine-executable instructions or data structures stored thereon. Such machine-readable media can be any available media, which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium that can be used to carry or store desired program code in the form of machine-executable instructions or data structures and that can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data, which cause a general purpose computer, special purpose computer, or special purpose processing machines to perform a certain function or group of functions.

Embodiments will be described in the general context of method steps that may be implemented in one embodiment by a program product including machine-executable instructions, such as program code, for example, in the form of program modules executed by machines in networked environments. Generally, program modules include routines, programs, objects, components, data structures, etc. that have the technical effect of performing particular tasks or implement particular abstract data types. Machine-executable instructions, associated data structures, and program modules represent examples of program code for executing steps of the method disclosed herein. The particular sequence of such executable instructions or associated data structures represent examples of corresponding acts for implementing the functions described in such steps.

Embodiments may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the internet and may use a wide variety of different communication protocols. Those skilled in the art will appreciate that such network computing environments will typically encompass many types of computer system configuration, including personal computers, hand-held devices, multiprocessor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination of hardwired or wireless links) through a communication network. In a distributed computing environment, program modules may be located in both local and remote memory storage devices.

An exemplary system for implementing the overall or portions of the exemplary embodiments might include a general purpose computing device in the form of a computer, including a processing unit, a system memory, and a system bus, that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

It will be understood that the term "actuator" can be virtually any device capable of affecting the state of a plant to control one or more degrees of freedom thereof. Such actuator can be a motor, motor-driven screw, a hydraulic cylinder, a pump or valve controlling a stream of air, a thermal heater, a compressor or suction generator, or other actuation device.

It will also be understood that the term "plant" refers to a system controlled by a control system. For example, the plant can be an aircraft, spacecraft, space-launch vehicle, satellite, missile, guided munition, automobile, or other vehicle. Such plant can also be a braking system, an engine, a transmission, or an active suspension, or other vehicle subsystem. The plant can be a manufacturing facility or a power generation facility. In general, the plant could be virtually any controllable system.

It will also be understood that the term "module" as used herein is an element or building block of the adaptive model-based control system to perform a function of the adaptive model-based control system. Such modules may be in the form of software, hardware, firmware or a combination thereof.

It will further be understood that the term "on-line" as used herein is a process or operation occurring in real-time or while the controlled plant is operating.

Referring now to FIG. 1, there is shown an adaptive model-based control system 10 for a controlled plant 20 having a plurality of actuators 21 to control a plant cycle 23. The adaptive model-based control system 10 comprises an adaptive model-based control module 30 and an adaptive plant model on-line reconfiguration module 40 having an adaptive plant model 41 and a nominal plant model 43. The plant 20 receives multiple plant input commands 22, corresponding to the operational state of the actuators 21 and generates multiple plant outputs 24 corresponding to the operating conditions of the plant 20 resulted from the plant input commands 22 and the plant cycle 23. The adaptive model-based control system 10 calculates the multiple plant inputs commands 22 to control multiple plant outputs 24, known as multiple-input multiple-output (MIMO) control. Each plant input command 22 drives an actuator output and any actuator output may affect multiple cycle outputs and therefor, multiple plant input commands 22 achieve control of the plant 20 having multiple plant outputs 24. The adaptive plant model on-line reconfiguration module 40 receives operating condition indications by plant output signals 42 from the plant 20 as well as other operating condition inputs 58 external to adaptive model-based control system 10 to generate model inputs 36 having nominal model inputs 38 and adaptive model inputs 37. The adaptive model-based control module 30 receives multiple inputs including an output tracking error between desired output references 32 and output feedbacks 34 of the actual plant outputs 24, model inputs 36 and plant state feedback 35 and uses these inputs to build an adaptive model-based control to calculate the plant inputs commands 22 in order to achieve the desired plant outputs 24.

The adaptive model-based control system 10 also comprises an output priority ranking module 50, an actuator mode management module 60, and a model error knowledge-base module 70.

The output priority ranking module 50 is configured to receive operating condition indicative outputs 56 from the plant outputs 24 as well as other operating condition inputs 58 external to the adaptive model-based control system 10 to provide output priorities 52 to the plant outputs 24. The output priority ranking module 50 is a function of the plant operating conditions and may vary depending on the operating condition. The output priorities 52 are predetermined based on the operating conditions and ranked from 1 to N (wherein N is the number of plant outputs 24 of the plant 20) in the order from the highest priority to the lowest priority for the all plant outputs 24. If there are two plant outputs 24 that have same priority at a given operating condition, their priorities are specified as one higher than the other.

The actuator mode management module 60 is configured to receive current actuator data 66 from the actuators 21 and predicted actuator data 68 from the adaptive plant model on-line reconfiguration module 40 and to use detection and identification logic to determine the current mode of each of the actuators 21 and provide an actuator mode flag 62 for each of the actuators 21. The current actuator data 66 is determined using sensors and may include but is not limited to positions, rates, critical faults, operating modes, or sensing failures. The predicted actuator data 68 is determined using the nominal plant model 43 and may include but is not limited positions, slew rates, tolerances, and limits. The current mode of each of the actuators 21 may be defined as an unconstrained actuator in an actuator unconstrained mode or a constrained actuator in a actuator constrained mode.

The actuator mode flag 62 may be classified into groups to represent the mode of each of the actuators 21. Constrained actuators 21 in a actuator constrained mode may be defined as in an actuator fixed-mode which are actuators 21 staying at a fixed position due to the actuators 21 being at an operation limit (on-limit), due to an actuator critical fault, and/or due to losing an actuator position sensing signal. Constrained actuators 21 in a actuator constrained mode may also be defined as actuators 21 that are in an actuator quasi-free moving mode which are actuators 21 that are moving but being deviated away from the nominal coordination with the rest of the actuators 21 and plant outputs 24, that is, by separately following a transient schedule to constrain the rest of the MIMO control system to a certain degree. Actuators 21 in an actuator unconstrained mode are actuators 21 in an actuator free moving mode that are moving freely and preserving the nominal coordination with the rest of the actuators 21 and the plant outputs 24.

Figure 2A:
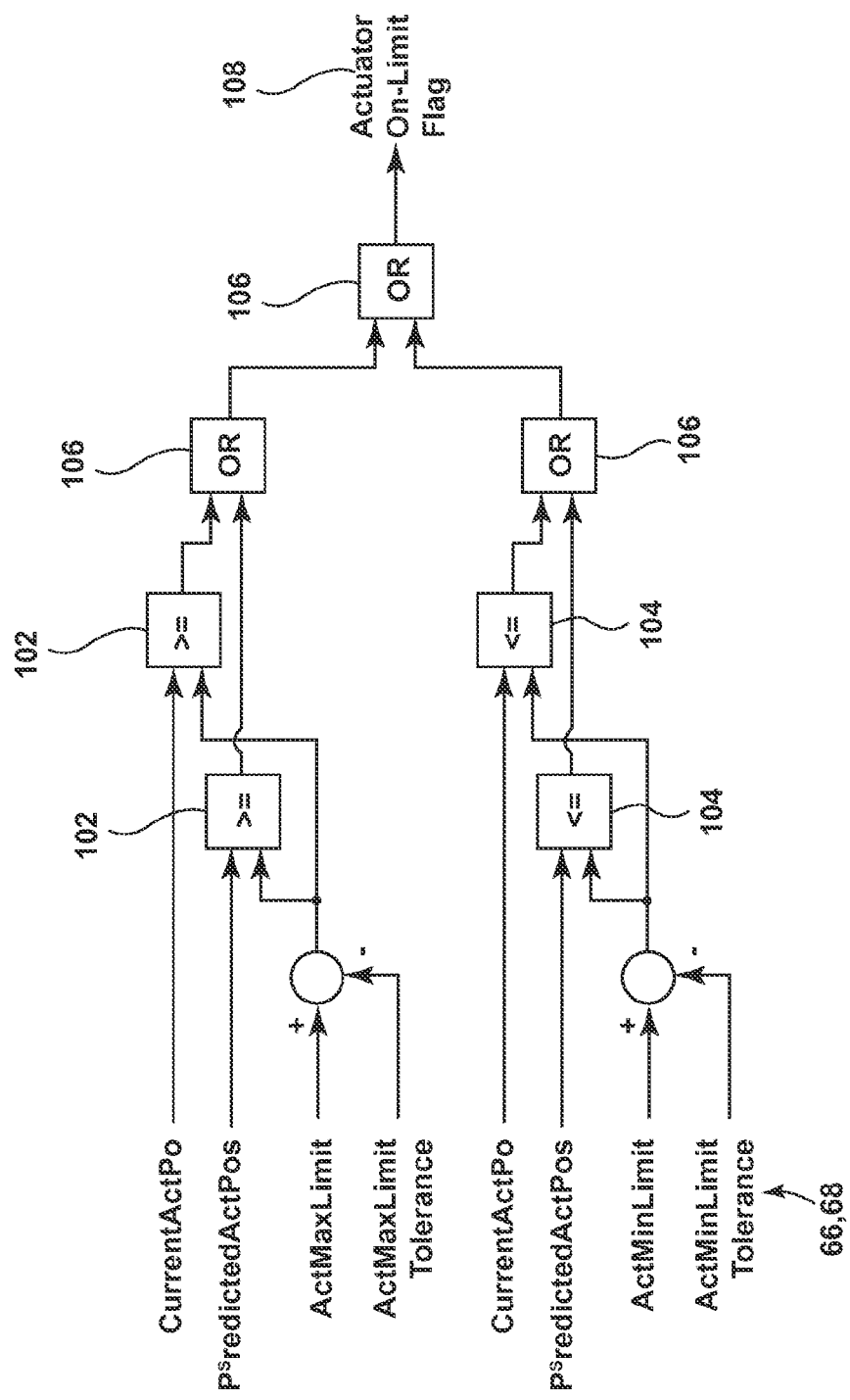
FIG. 2A is a block diagram representation of the actuator on-limit detection logic of the actuator current mode management module according to an embodiment of the invention.

FIG. 2A shows the actuator on-limit detection logic 100 of the actuator mode management module (shown in FIG. 1) used to detect if each actuator is on-limit and to generate an actuator on-limit flag 108. The actuator on-limit detection logic 100 uses current actuator data 66 and predicted actuator data 68, comparing blocks 102, 104 and OR blocks 106 to generate the actuator on-limit flag 108. The current actuator positions and predicted actuator positions are compared with actuator minimum and maximum limits and tolerances using comparing blocks 102, 104 to determine if either the current or predicted actuator positions are above or below the actuator limits taking into account the limit tolerances. The actuator on-limit flag 108 is then generated by determining if the current or predicted actuator positions are either above or below the actuator limits, taking into account the limit tolerances, using the OR blocks 106.

Figure 2B:
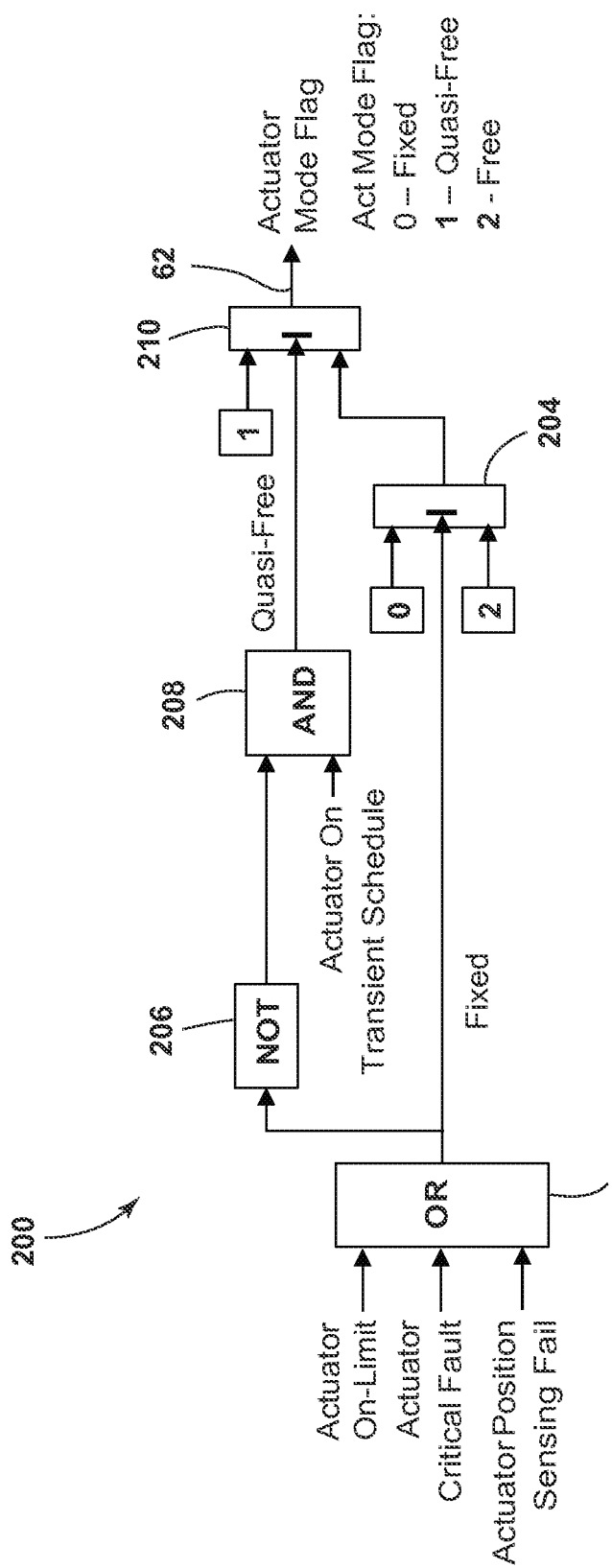
FIG. 2B is a block diagram representation of the actuator mode identification logic of the actuator mode management module according to an embodiment of the invention.

FIG. 2B shows the actuator mode identification logic 200 of the actuator mode management module (FIG. 1) used to identify the mode of each actuator and generate the actuator mode flag 62. The actuator mode flag 62 may be represented as:
    0=Fixed Mode
    1=Quasi-Free Mode
    2=Free Mode The actuator mode identification logic 200 uses the actuator on-limit flag (FIG. 2A), an actuator critical fault flag, an actuator position sensing fail flag and actuator on transient schedule flag to generate the actuator mode flag 62. The actuator critical fault flag and the actuator position sensing fail flag are detected based on the current actuator data (FIG. 1) and are assumed a known flag. The actuator on transient Schedule flag is also from the current actuator data (FIG. 1) inherited from control specified actuator command data. An OR block 202 determines if an actuator on-limit, critical fault, or position sensing fail is present. A NOT block 206 and an AND block 208 determine if an actuator is in a quasi-free mode. A first decision block 204 outputs if an actuator is in a fixed mode or a free mode and a second decision block 210 outputs the actuator mode flag 62 corresponding to the determined mode of the actuators.

Referring again to FIG. 1, the model error knowledge-base module 70 is configured to receive operating condition indicative outputs 56 from the plant outputs 24 as well as other operating condition inputs 58 external to adaptive model-based control system 10 to generate a model error flag 72. The model error knowledge-base module 70 may be generated based on off-line analysis, tests, and other data. Model errors may be closely correlated with certain operating conditions which in general reflect the edge of the linearized model valid space. The model error knowledge-base module 70 provides the model error flag 72 to indicate what type of model error there is and points to the predetermined plant model changes that may be needed. The model error flag 72 may be indicative of a known modeling error or a known un-modeled dynamic impact which may affect a plant output 24. The model error flag 72 may be represented as:
    0=Nominal (no modeling error)
    1=Known Modeling Error
    2=Known Un-modeled Dynamic Impact The adaptive model-based control system 10 also comprises a plant model adaptive factor array management module 80 configured to receive the actuator mode flag 62, the output priorities 52 and the model error flag 72 to construct and output plant model adaptive factor arrays 82. The plant model adaptive factor array management module 80 determines the rules for managing the plant model adaptive factor arrays 82 representing the plant changes identified from the actuator mode flag 62, output priorities 52 and model error flag 72.

The adaptive plant model on-line reconfiguration module 40 uses the plant model adaptive factor arrays 82 such that it mathematically reconfigures the adaptive plant model 41 to represent the plant changes indicated by the actuator mode flag 62, output priorities 52 and model error flag 72. The adaptive plant model on-line reconfiguration module 40 generates the adaptive model inputs 37 which contain calculations based on the reconfigured adaptive plant model 41 as well as the nominal model inputs 38 which contain calculations based on the nominal plant model 43.

The adaptive model-based control module 30 mathematically adapts to the adaptive plant model on-line reconfiguration module 40 to build a model-based control to determine the plant input commands 22 by using logic that incorporates the nominal plant model 43 obtained through the nominal model inputs 38 and the reconfigured adaptive plant model 41 obtained through the adaptive model inputs 37 or a combination thereof, thereby realizing real-time control adaptation. In doing so, the adaptive model-based control module 30 inherits the reconfigured adaptive plant model 41 such that it adapts the plant changes automatically. The adaptive model-based control module 30 may isolate the actuators 21 in an actuator constrained mode from the highest priority plant outputs 24 from a highest priority output set, thereby realizing real-time model-based control that adapts to the plant changes while maximizing the free mode actuators 21 capability and isolating the ineffective actuators 21 from the control system. The adaptive model-based control module 30 may also return the isolated actuators 21 in an actuator constrained mode to an actuator unconstrained mode so as to integrate the isolated actuators 21 with the highest priority plant outputs 24 in the highest priority output set and the control system.

It will be understood that any model-based control may be used to adapt the plant changes in order to realize real-time control adaptation, such as dynamic inversion, linear-quadratic regulator (LQR), linear-quadratic-Gaussian (LQG), loop transfer recovery (LTR) or quadratic programming (QP).

The design procedures, approaches and examples of the adaptive model-based control system 10 are described below.

A state space model is a mathematical model of a physical system as a set of input, output and state variables related by first-order differential equations. In general, a plant model may be represented by a state space model:

$$x(k+1)=Ax(k)+Bu(k);\quad\quad\quad\text{(Eq. 1a)}$$

$$y(k)=Cx(k)\quad\quad\quad\text{(Eq. 1b)}$$

When using a linear-quadratic regulator (LQR) design for generating the model-based control, if the control objective is to make the output y track output reference $y_r$, the perturbation state defined as $z(k)=[\hat{x}(k)\ e_y(k)]^T$, and where $\hat{x}(k)=x(k)-x(k-1)$, $e_y(k)=y(k)-y_r(k)$, $\hat{u}(k)=u(k)-u(k-1)$, then the state space model (Eq. 1a and 1b) can be transformed into a perturbation model:

$$z(k+1)=A_c z(k)+B_c \hat{u}(k)\quad\quad\quad\text{(Eq. 2)}$$

$$\text{Where } A_c = \begin{bmatrix} A & 0 \\ CA & I \end{bmatrix},\ B_c = \begin{bmatrix} B \\ CB \end{bmatrix}.$$

Introducing the quadratic cost function:

$$J=\Sigma_{k=0}^{\infty}[z^T(k)Qz(k)+\hat{u}^T(k)R\hat{u}(k)]\quad\quad\quad\text{(Eq. 3)}$$

Yields the optimal control:

$$\hat{u}(k)=-K_M z(k)\quad\quad\quad\text{(Eq. 4)}$$

Where $K_M=(R+B_C^T PB_C)^{-1}B_C^T PA_C$, and $P=P^T>0$ is the solution of the algebraic Riccati equation: $P=Q+A_C^T P[I-B_C(R+B_C^T PB_C)^{-1}B_C^T P]A_C$.

When taking into consideration the disturbances in the plant, the plant model may be represented by a state space model in perturbation format as shown below:

$$\hat{x}(k+1)=A\hat{x}(k)+B\hat{u}(k)+B_d\hat{d}(k);\quad\quad\quad\text{(Eq. 5a)}$$

$$\hat{y}(k)=C\hat{x}(k)+D_d\hat{d}(k)\quad\quad\quad\text{(Eq. 5b)}$$

Where the perturbations are defined as: $\hat{x}(k+1)=x(k+1)-x(k)$, $\hat{u}(k)=u(k)-u(k-1)$, $\hat{d}(k+1)=d(k+1)-d(k)$, and $\hat{y}(k)=y(k)-y(k-1)$.

When using a dynamic inversion decoupling control design for generating the model-based control, assuming that the relative degree of each output is 2, that $\hat{d}(k+1)\approx\hat{d}(k)-\hat{d}(k-1)=\hat{d}(k)$ and $\hat{d}(k+2)\approx 2\hat{d}(k)$, then:

$$\begin{aligned}\hat{y}(k+1)&=CA\hat{x}(k)+CB\hat{u}(k)+CB_d\hat{d}(k)+D_d\hat{d}(k+1)\\&=CA\hat{x}(k)+(CB_d+D_d)\hat{d}(k);\end{aligned}\quad\text{(Eq. 6)}$$

$$\begin{aligned}\hat{y}(k+2)&=CA^2\hat{x}(k)+CAB\hat{u}(k)+CAB_d\hat{d}(k)+\\&\quad CAB_d\hat{d}(k+1)+D_d\hat{d}(k+2)\\&=CA^2\hat{x}(k)+CAB\hat{u}(k)+(CAB_d+CB_d+2D_d)\hat{d}(k)\\&=CAB\hat{u}(k)+\big(CA^2\hat{x}(k)+(CAB_d+CB_d+2D_d)\hat{d}(k)\big)\end{aligned}\quad\text{(Eq. 7)}$$

An input-output mapping matrix, also called the plant model matrix or decoupling matrix is defined as:

$$E=CAB\quad\quad\quad\text{(Eq. 8)}$$

The free response of the plant is represented as:

$$\begin{aligned}\hat{y}^{pf}(k)&=CA^2\hat{x}(k)+(CAB_d+CB_d+2D_d)\hat{d}(k)\\&=k_x^{pf}(C,A)\hat{x}(k)+k_d^{pf}(C,A,B_d,D_d)\hat{d}(k)\end{aligned}\quad\text{(Eq. 9)}$$

The plant response comprises two parts; the input response or forced response and the free response. The plant response is thus represented as:

$$\hat{y}(k+2)=E\hat{u}(k)+\hat{y}^{pf}(k)\quad\quad\quad\text{(Eq. 10)}$$

The control input u only impacts the plant input response via the input-output mapping matrix E and the plant free response is independent of the control input u. (Eq. 7) shows that the model input matrix B only appears in the input-output mapping matrix E. To completely control the plant response, a control needs to counteract with the free response while shaping the desired plant response via the input response. When using dynamic inversion to design the model-based control, a pseudo-input v can be used and the control may be chosen as:

$$\hat{u}(k)=E^{-1}(v(k)-\hat{y}^{pf}(k)),\quad\quad\quad\text{(Eq. 11)}$$

When substituting (Eq. 11) into (Eq. 10), the plant response is decoupled into one-to-one input-output relationship:

$$\hat{y}(k+2)=v(k)\quad\quad\quad\text{(Eq. 12)}$$

With a one-to-one input-output relationship, any single-input single-output (SISO) control design approach can be applied to (Eq. 12) so that the output tracks an output reference. If the desired response is shaped as:

$$\hat{y}(k+2)+k_1\hat{y}(k+1)+k_0\hat{y}(k)=K_v v(k);\quad\quad\quad\text{(Eq. 13)}$$

Where the coefficients $k_1$ and $k_0$ are calculated based on selected desired poles $\lambda$ of each SISO loop of the decoupled plant response, then substituting (Eq. 5b) and (Eq. 6) into (Eq. 13) yields:

$$\hat{y}(k+2)=K_v(\lambda)v(k)+k_x^D(\lambda,C,A)\hat{x}(k)+k_d^D(\lambda,C,A,B_d,D_d)\hat{d}(k);\quad\text{(Eq. 14)}$$

Where $\lambda$ represents the desired poles of each SISO loop of the decoupled plant response.

Comparing (Eq. 14) with (Eq. 10) yields the model-based decoupling control:

$$\hat{u}(k) = E^{-1}(K_v v(k) + k_x^P \hat{x}(k) + k_d^P \hat{d}(k) - k_x^P \hat{x}(k) - k_d^P \hat{d}(k)) \quad \text{(Eq. 15)}$$

$$= E^{-1}(K_v v(k) + K_x \hat{x}(k) + K_d \hat{d}(k))$$

From (Eq. 4) the general model-based optimal control is:

$$\hat{u}(k) = -\left(R + \begin{bmatrix} B \\ CB \end{bmatrix}^T P \begin{bmatrix} B \\ CB \end{bmatrix}\right)^{-1} \begin{bmatrix} B \\ CB \end{bmatrix}^T P \begin{bmatrix} A & 0 \\ CA & I \end{bmatrix} z(k) \quad \text{(Eq. 16)}$$

Where the optimal control gain is calculated based on model parameters A, B, and C.

From (Eq. 15), the general model-based dynamics-inversion decoupling control is:

$$\hat{u}(k) = E^{-1}(K_v v(k) + K_x \hat{x}(k) + K_d \hat{d}(k)) \quad \text{(Eq. 17)}$$

$$= (CAB)^{-1}((K_v(\lambda) \cdot v(k) + K_x(C, A, B_d, D_d, \lambda) \cdot \hat{x}(k) + K_d(C, A, B_d, D_d, \lambda) \hat{d}(k))$$

Where $$K_x = -C(A^2 + k_1 A + k_0 I),$$
$$K = -[C(AB_d + (1 * I + k_1)B_d) + (2 * I + k_1 + k_0)D_d)].$$

The control gain has four parts, the decoupling part E is based on model parameters A, B, and C. The free response cancelling parts $k_x$ and $K_d$ are based on model parameters A, $B_d$, C and $D_d$ and the design parameters for desired dynamic response. The output tracking part K is based on the selected design parameters for desired output tracking.

The plant changes are considered as being caused by the inputs changes, i.e., actuator mode changes and output priority transitions. The actuator mode changes can be completely characterized by B and are represented by B only and the control output priority transitions can be represented by C only, that is, in general, the plant changes are to be captured by the plant model adaptive factor arrays 82 via input matrix B and output matrix C.

The plant model adaptive factor arrays 82 applied to B and C can represent the concise actuator mode changes and intended output priority transitions completely such that the resulted adaptive model-based control module 30 can automatically inherit the plant changes captured by the adaptive plant model 41 with adaptive B and C (adaptive model inputs 37). This generic approach applies to any model-based control.

A controlled plant model is usually built based on nominal operating conditions and the output control priorities are predetermined based on the nominal operating conditions. For a multivariable control system, the plant model matrix is arranged based on the presence of predetermined dominant pairs. If one control input has a greater control effect on one output more so than the other control inputs, and this one control input has the most control effect on this one output more so than on the other outputs, then this one control input and this one output is a dominant pair, and their relation term is placed on the major diagonal line of the model matrix. In some cases, the model matrix comprises dominant pairs for all input-output pairs, defining the model matrix as a full set of dominant pairs. In other cases, the model matrix comprises dominant pairs for only some of the input-output pairs, defining the model matrix as a partial set of dominant pairs. In generic cases, the model matrix does not comprise any dominant pairs for input-output pairs, defining the model matrix as a zero set of dominant pairs.

In an illustrative example, a multivariable control system has four control actuators 21 defining four inputs: $u_1$, $u_2$, $u_3$, $u_4$, four outputs: $y_1$, $y_2$, $y_3$, $y_4$, and an input-output model matrix E where the plant input-output mapping model may be represented by:

$$\Delta y = E * \Delta u; \text{ and}$$

$$\begin{bmatrix} \Delta y_1 \\ \Delta y_2 \\ \Delta y_3 \\ \Delta y_4 \end{bmatrix} = \begin{bmatrix} e_{11} & e_{12} & e_{13} & e_{14} \\ e_{21} & e_{22} & e_{23} & e_{24} \\ e_{31} & e_{32} & e_{33} & e_{34} \\ e_{41} & e_{42} & e_{43} & e_{44} \end{bmatrix} * \begin{bmatrix} \Delta u_1 \\ \Delta u_2 \\ \Delta u_3 \\ \Delta u_4 \end{bmatrix}$$

In the model matrix, ($u_i$, $y_i$) is a dominant pair if $e_{i,i} \gg e_{i,j}$ and $e_{i,i} \gg e_{j,i}$, for any i=1, 2, 3, 4 and j=1, 2, 3, 4 where i≠j. The model matrix is a full set of dominate pairs if $e_{i,i} \gg e_{i,j}$ and $e_{i,i} \gg e_{j,i}$, for all i=1, 2, 3, 4 and j=1, 2, 3, 4 where i≠j.

Based on different cases involving the actuator mode flag 62, output priorities 52, and a model error flag 72, the plant model adaptive factor array management module 80 may follow different rules in constructing the plant model adaptive factor arrays 82 and the dominant pair for the input-output pairs may come into effect.

In case 1 where an actuator is in the fixed mode, the rule is: separate the input-output pair formed by this fixed mode actuator and current the lowest priority plant output 24 from the remaining MIMO controlled plant 20.

If the actuator is fixed due to the actuator being normally on-limit, it may be treated either as the known disturbance input to the reduced-order MIMO subsystem or not as the known disturbance input to the reduced-order MIMO subsystem. The effects of both ways are equivalent since the actuator incremental input is 0 when it is in fixed mode. However, if the actuator is in the fixed mode due to an actuator critical functional failure or position signal loss, it should not be treated as the known disturbance input to the reduced-order MIMO subsystem because the actuator dynamic behavior may be unpredictable until it really reaches its predetermined fixed position.

In case 2 where an actuator(s) is in the quasi-free mode moving along a transient schedule, two different rules may apply. If the plant outputs 24 have distinctive priorities regardless if dominant pairs exist or not, the rule is: separate the input-output pair formed by this quasi-free moving actuator and current the lowest priority plant output 24 from the remaining MIMO controlled plant 20. The reduced-order subsystem is selected by specifying the higher priority set of plant outputs 24 to be associated with free moving actuators 21.

The quasi-free moving actuator should be treated as the known disturbance input to the reduced-order MIMO subsystem.

If some plant outputs 24 have the same or similar priorities, the rule is: separate the input-output pair formed by this quasi-free moving actuator and an output in current the lowest priority plant output 24 set from the remaining MIMO controlled plant 20. This plant output 24 should be chosen such that the dominant pairs of the free moving actuators and the associated plant outputs 24 can be preserved as much as possible.

In case 3 where a known un-modeled dynamics or a known modeling error have adverse impact on the interactions of actuators 21 and plant outputs 24, the rule is: set predetermined specific values for the elements of the model adaptive arrays corresponding to the involved actuators 21 and/or plant outputs 24.

If the plant 20 is not in any of the cases listed above, the plant model adaptive factor arrays 82 should keep their default values.

Without limitation, assume that a generic state space model of a plant has the following dimensions: $x \in R^{5 \times 5}$, $u \in R^4$, $y \in R^4$ used by the following examples and that the adaptive plant model 41 has the state matrix A, the input matrix B, and the output matrix C, which are:

$$A = \begin{bmatrix} a_{11} & a_{12} & a_{13} & a_{14} & a_{15} \\ a_{21} & a_{22} & a_{23} & a_{24} & a_{25} \\ a_{31} & a_{32} & a_{33} & a_{34} & a_{35} \\ a_{41} & a_{42} & a_{43} & a_{44} & a_{45} \\ a_{51} & a_{52} & a_{53} & a_{54} & a_{55} \end{bmatrix} = [A_{C1} \ A_{C2} \ A_{C3} \ A_{C4} \ A_{C5}];$$

$$B = \begin{bmatrix} b_{11} & b_{12} & b_{13} & b_{14} \\ b_{21} & b_{22} & b_{23} & b_{24} \\ b_{31} & b_{32} & b_{33} & b_{34} \\ b_{41} & b_{42} & b_{43} & b_{44} \\ b_{51} & b_{52} & b_{53} & b_{54} \end{bmatrix} = [B_{C1} \ B_{C2} \ B_{C3} \ B_{C4}];$$

$$C = \begin{bmatrix} c_{11} & c_{12} & c_{13} & c_{14} & c_{15} \\ c_{21} & c_{22} & c_{23} & c_{24} & c_{25} \\ c_{31} & c_{32} & c_{33} & c_{34} & c_{35} \\ c_{41} & c_{42} & c_{43} & c_{44} & c_{45} \end{bmatrix} = \begin{bmatrix} C_{R1} \\ C_{R2} \\ C_{R3} \\ C_{R4} \end{bmatrix}$$

Assuming all outputs have a relative degree of 2, the decoupling matrix E is:

$$E = CAB = \begin{bmatrix} e_{11} & e_{12} & e_{13} & e_{14} \\ e_{21} & e_{22} & e_{23} & e_{24} \\ e_{31} & e_{32} & e_{33} & e_{34} \\ e_{41} & e_{42} & e_{43} & e_{44} \end{bmatrix}$$

The real-time plant model adaptive factor arrays 82 need to represent the plant changes caused by model error and/or actuator mode changes and output priority transitions, therefore, six common plant model adaptive factor arrays 82 are selected: Model Error Input Adaptive Factor Array $K_{pmE}^{IN}$, Model Error Output Adaptive Factor Array $K_{pmE}^{OUT}$ for model error adaptation, Model Input Change Adaptive Factor Array $K_{pX}^{IN}$, Model Output Change Adaptive Factor array $K_{pX}^{IN}$ for separating the quasi-free moving actuator(s) from the remaining MIMO plant model, Model Known Disturbance Input ID Adaptive Factor Array $K_{kD}^{IN}$ and Model Known Disturbance Output ID Adaptive Factor Array $K_{kd}^{OUT}$ for treating the quasi-free moving actuator(s) as known disturbance input(s) to the remaining MIMO plant model.

$K_{pmE}^{IN}$, $K_{pX}^{IN}$ and $K_{kd}^{IN}$ have the same size as the model input matrix B. $K_{pmE}^{OUT}$, $K_{pX}^{OUT}$ and $K_{kd}^{OUT}$ have the same size as the model output matrix C.

For dynamics inversion type model-based control, the real-time plant model adaptive factor arrays 82 for the specific model adaptive method are noted as: $K_{pmE}^{IO}$, $K_{pX}^{IO}$ and $K_{kd}^{IO}$, which all have the same size as the model input-output decoupling matrix E.

In nominal operation, all of the plant model adaptive factor arrays 82 keep their default values as below:

$$K_{pmE}^{IN} = \begin{bmatrix} k_{pmE11}^B & k_{pmE12}^B & k_{pmE13}^B & k_{pmE14}^B \\ k_{pmE21}^B & k_{pmE22}^B & k_{pmE23}^B & k_{pmE24}^B \\ k_{pmE31}^B & k_{pmE32}^B & k_{pmE33}^B & k_{pmE34}^B \\ k_{pmE41}^B & k_{pmE42}^B & k_{pmE43}^B & k_{pmE44}^B \\ k_{pmE51}^B & k_{pmE52}^B & k_{pmE53}^B & k_{pmE54}^B \end{bmatrix} = \begin{bmatrix} 1 & 1 & 1 & 1 \\ 1 & 1 & 1 & 1 \\ 1 & 1 & 1 & 1 \\ 1 & 1 & 1 & 1 \\ 1 & 1 & 1 & 1 \end{bmatrix} \quad \text{(Eq. 18a)}$$

$$K_{pX}^{IN} = \begin{bmatrix} k_{pX11}^B & k_{pX12}^B & k_{pX13}^B & k_{pX14}^B \\ k_{pX21}^B & k_{pX22}^B & k_{pX23}^B & k_{pX24}^B \\ k_{pX31}^B & k_{pX32}^B & k_{pX33}^B & k_{pX34}^B \\ k_{pX41}^B & k_{pX42}^B & k_{pX43}^B & k_{pX44}^B \\ k_{pX51}^B & k_{pX52}^B & k_{pX53}^B & k_{pX54}^B \end{bmatrix} = \begin{bmatrix} 1 & 1 & 1 & 1 \\ 1 & 1 & 1 & 1 \\ 1 & 1 & 1 & 1 \\ 1 & 1 & 1 & 1 \\ 1 & 1 & 1 & 1 \end{bmatrix} \quad \text{(Eq. 18b)}$$

$$K_{pmE}^{OUT} = \begin{bmatrix} k_{pmE11}^C & k_{pmE12}^C & k_{pmE13}^C & k_{pmE14}^C & k_{pmE15}^C \\ k_{pmE21}^C & k_{pmE22}^C & k_{pmE23}^C & k_{pmE24}^C & k_{pmE25}^C \\ k_{pmE31}^C & k_{pmE32}^C & k_{pmE33}^C & k_{pmE34}^C & k_{pmE35}^C \\ k_{pmE41}^C & k_{pmE42}^C & k_{pmE43}^C & k_{pmE44}^C & k_{pmE45}^C \end{bmatrix} = \begin{bmatrix} 1 & 1 & 1 & 1 & 1 \\ 1 & 1 & 1 & 1 & 1 \\ 1 & 1 & 1 & 1 & 1 \\ 1 & 1 & 1 & 1 & 1 \end{bmatrix} \quad \text{(Eq. 18c)}$$

$$K_{pX}^{OUT} = \begin{bmatrix} k_{pX11}^C & k_{pX12}^C & k_{pX13}^C & k_{pX14}^C & k_{pX15}^C \\ k_{pX21}^C & k_{pX22}^C & k_{pX23}^C & k_{pX24}^C & k_{pX25}^C \\ k_{pX31}^C & k_{pX32}^C & k_{pX33}^C & k_{pX34}^C & k_{pX35}^C \\ k_{pX41}^C & k_{pX42}^C & k_{pX43}^C & k_{pX44}^C & k_{pX45}^C \end{bmatrix} = \begin{bmatrix} 1 & 1 & 1 & 1 & 1 \\ 1 & 1 & 1 & 1 & 1 \\ 1 & 1 & 1 & 1 & 1 \\ 1 & 1 & 1 & 1 & 1 \end{bmatrix} \quad \text{(Eq. 18d)}$$

$$K_{kd}^{IN} = \begin{bmatrix} k_{kd11}^B & k_{kd12}^B & k_{kd13}^B & k_{kd14}^B \\ k_{kd21}^B & k_{kd22}^B & k_{kd23}^B & k_{kd24}^B \\ k_{kd31}^B & k_{kd32}^B & k_{kd33}^B & k_{kd34}^B \\ k_{kd41}^B & k_{kd42}^B & k_{kd43}^B & k_{kd44}^B \\ k_{kd51}^B & k_{kd52}^B & k_{kd53}^B & k_{kd54}^B \end{bmatrix} = \begin{bmatrix} 0 & 0 & 0 & 0 \\ 0 & 0 & 0 & 0 \\ 0 & 0 & 0 & 0 \\ 0 & 0 & 0 & 0 \\ 0 & 0 & 0 & 0 \end{bmatrix} \quad \text{(Eq. 18e)}$$

$$K_{kd}^{OUT} = \begin{bmatrix} k_{kd11}^C & k_{kd12}^C & k_{kd13}^C & k_{kd14}^C & k_{kd15}^C \\ k_{kd21}^C & k_{kd22}^C & k_{kd23}^C & k_{kd24}^C & k_{kd25}^C \\ k_{kd31}^C & k_{kd32}^C & k_{kd33}^C & k_{kd34}^C & k_{kd35}^C \\ k_{kd41}^C & k_{kd42}^C & k_{kd43}^C & k_{kd44}^C & k_{kd45}^C \end{bmatrix} = \begin{bmatrix} 0 & 0 & 0 & 0 & 0 \\ 0 & 0 & 0 & 0 & 0 \\ 0 & 0 & 0 & 0 & 0 \\ 0 & 0 & 0 & 0 & 0 \end{bmatrix} \quad \text{(Eq. 18f)}$$

$$K_{pmE}^{IO} = \begin{bmatrix} k_{pmE11}^E & k_{pmE12}^E & k_{pmE13}^E & k_{pmE14}^E \\ k_{pmE21}^E & k_{pmE22}^E & k_{pmE23}^E & k_{pmE24}^E \\ k_{pmE31}^E & k_{pmE32}^E & k_{pmE33}^E & k_{pmE34}^E \\ k_{pmE41}^E & k_{pmE42}^E & k_{pmE43}^E & k_{pmE44}^E \end{bmatrix} = \begin{bmatrix} 1 & 1 & 1 & 1 \\ 1 & 1 & 1 & 1 \\ 1 & 1 & 1 & 1 \\ 1 & 1 & 1 & 1 \end{bmatrix} \quad \text{(Eq. 18g)}$$

-continued $$K_{pX}^{IO} = \begin{bmatrix} k_{pX11}^E & k_{pX12}^E & k_{pX13}^E & k_{pX14}^E \\ k_{pX21}^E & k_{pX22}^E & k_{pX23}^E & k_{pX24}^E \\ k_{pX31}^E & k_{pX32}^E & k_{pX33}^E & k_{pX34}^E \\ k_{pX41}^E & k_{pX42}^E & k_{pX43}^E & k_{pX44}^E \end{bmatrix} = \begin{bmatrix} 1 & 1 & 1 & 1 \\ 1 & 1 & 1 & 1 \\ 1 & 1 & 1 & 1 \\ 1 & 1 & 1 & 1 \end{bmatrix} \quad \text{(Eq. 18h)}$$

$$K_{kd}^{IO} = \begin{bmatrix} k_{kd11}^E & k_{kd12}^E & k_{kd13}^E & k_{pX14}^E \\ k_{kd21}^E & k_{kd22}^E & k_{kd23}^E & k_{kd24}^E \\ k_{kd31}^E & k_{kd32}^E & k_{kd33}^E & k_{kd34}^E \\ k_{kd41}^E & k_{kd42}^E & k_{kd43}^E & k_{kd44}^E \end{bmatrix} = \begin{bmatrix} 0 & 0 & 0 & 0 \\ 0 & 0 & 0 & 0 \\ 0 & 0 & 0 & 0 \\ 0 & 0 & 0 & 0 \end{bmatrix} \quad \text{(Eq. 18i)}$$

Where the elements of the Model Adaptive Factor Arrays $K_{pX}^{IN}$, $K_{pX}^{OUT}$, $K_{kd}^{IN}$, $K_{kd}^{OUT}$, $K_{pX}^{IO}$ and $K_{kd}^{IO}$ may have values of either 1 or 0, and the elements of the Model Error Adaptive Factor Arrays $K_{pmE}^{IN}$, $K_{pmE}^{OUT}$ and $K_{pmE}^{IO}$ may have values in the range of [0, 100].

The steps to determine the plant model adaptive factor arrays 82 are listed below using an illustrative example.

Using the same 4×4 plant example as aforementioned, assume actuator number 2 is in a non-free moving mode and output 4 has the lowest priority, that all the outputs have a relative degree of 2 and that the model error flag 72 is 0. Based on the rules for case 1 or case 2, the input-output pair of $\hat{u}_2$ and $\hat{y}_4$ need to be separated from the remaining MIMO control, it follows that:

(a) $K_{pmE}^{OUT}$, $K_{pmE}^{IN}$ and/or $K_{pmE}^{IO}$ keep their default values;

(b) $K_{pX}^{OUT}$ is chosen such that $C_{R4}=0$ and the rest of the elements in $C_a$ remain the same as nominal after the element-wise product of $K_{pX}^{OUT}$ and C, i.e.:

$$K_{pX}^{OUT} = \begin{bmatrix} 1 & 1 & 1 & 1 & 1 \\ 1 & 1 & 1 & 1 & 1 \\ 1 & 1 & 1 & 1 & 1 \\ 0 & 0 & 0 & 0 & 0 \end{bmatrix}$$

(c) $K_{pX}^{IN}$ is chosen such that $B_{c2}=0$ and the rest of the elements in $B_a$ remain the same as nominal after the element-wise product of $K_{pX}^{IN}$ and B, i.e.:

$$K_{pX}^{IN} = \begin{bmatrix} 1 & 0 & 1 & 1 \\ 1 & 0 & 1 & 1 \\ 1 & 0 & 1 & 1 \\ 1 & 0 & 1 & 1 \\ 1 & 0 & 1 & 1 \end{bmatrix}$$

(d) For specific dynamics inversion decoupling control $K_{pX}^{IO}$ is chosen such that $e_{i2}=0$, i=1, 2, 3, $e_{4j}=0$, j=1, 3, 4 and the rest of the elements in $E_a$ remain the same as nominal after the element-wise product of $K_{pX}^{IO}$ and E, i.e.:

$$K_{pX}^{IO} = \begin{bmatrix} 1 & 0 & 1 & 1 \\ 1 & 0 & 1 & 1 \\ 1 & 0 & 1 & 1 \\ 0 & 1 & 0 & 0 \end{bmatrix}$$

Now that $\hat{u}_2$ is separated from the remaining 3×3 plant, $\hat{u}_2$ needs to be considered as a known disturbance input to the outputs: $\hat{y}_i$, i=1, 2, 3 since $\hat{u}_2$ is either equal to zero (in a fixed position) or equal to its transient schedule reference predetermined value (in a quasi-free moving mode). The known disturbance input contributions to $\hat{y}_i$, i=1, 2, 3 need to be removed from $\hat{y}_i$, i=1, 2, 3 as $\hat{y}_i$, i=1, 2, 3 are used to calculate the net control for the remaining reduced order MIMO control, which leads to:

(e) $K_{kd}^{IN}$ is chosen such that $B_{C2}\neq 0$ and the rest of the elements in $B_a^{KD}$ are equal to 0, i.e.:

$$K_{kd}^{IN} = \begin{bmatrix} 0 & 1 & 0 & 0 \\ 0 & 1 & 0 & 0 \\ 0 & 1 & 0 & 0 \\ 0 & 1 & 0 & 0 \\ 0 & 1 & 0 & 0 \end{bmatrix}$$

(f) $K_{kd}^{OUT}$ is chosen such that $C_{R4}\neq 0$ and the rest of the elements in $C_a^{KD}$ are equal to 0, i.e.:

$$K_{kd}^{OUT} = \begin{bmatrix} 0 & 0 & 0 & 0 & 0 \\ 0 & 0 & 0 & 0 & 0 \\ 0 & 0 & 0 & 0 & 0 \\ 1 & 1 & 1 & 1 & 1 \end{bmatrix}$$

(g) For specific dynamic inversion decoupling control, $K_{kd}^{IO}$ is chosen such that $e_{i2}\neq 0$, i=1, 2, 3 and the rest of the elements in $E_{kd}$ are equal to 0, i.e.:

$$K_{kd}^{IO} = \begin{bmatrix} 0 & 1 & 0 & 0 \\ 0 & 1 & 0 & 0 \\ 0 & 1 & 0 & 0 \\ 0 & 0 & 0 & 0 \end{bmatrix}$$

Figure 3:
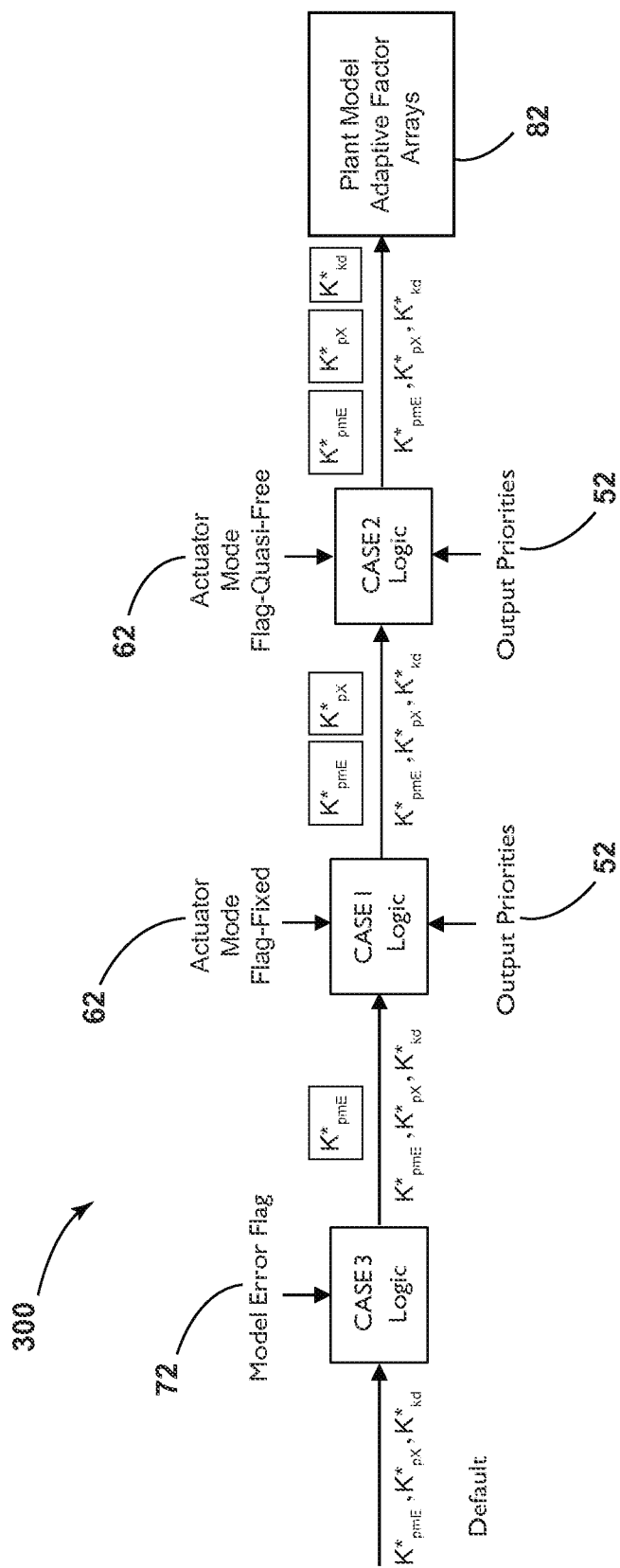
FIG. 3 is a block diagram representation of plant model adaptive factor array management module logic according to an embodiment of the invention.

Referring now to FIG. 3, there is shown a model adaptive factor array decision maker 300 used by the plant model adaptive factor array management module 80 shown in FIG. 1. The plant model adaptive factor arrays 82 are formed in the sequence specified by the model adaptive factor array decision maker 300 using the model error flag 72, the actuator mode flag 62 and the output priorities 52. If the model error flag 72 is 0, the plant model adaptive factor arrays 82 with default values are directly passed through CASE 3 on to the CASE 1 check. Otherwise, the predetermined rules for CASE 3 are applied to $K^*_{pmE}$, *=IN,OUT based on the model error flag 72 value and the resulted model adaptive factors are passed on to the CASE 1 check. If the actuator mode flag 62 is 0, the predetermined rules for CASE 1 are applied to $K^*_{pX}$, *=IN,OUT and the resulted model adaptive factors are passed on to the CASE 2 check. If the actuator mode flag 62 is 1, the predetermined rules for CASE 2 are applied to $K^*_{pX}$, *=IN,OUT and $K^*_{kd}$, *=IN, OUT for dynamic inversion type model-based control and the completed resulted plant model adaptive factor arrays 82 are passed on the adaptive plant model on-line reconfiguration module 40 shown in FIG. 1. If the actuator mode flag 62 is not 0 or 1, then $K^*_{pX}$, *=IN,OUT and $K^*_{kd}$, *=IN,OUT keep the default values.

Referring again to FIG. 1, the adaptive plant model on-line reconfiguration module 40 is used for the generic model-based control. From (Eq. 1), the nominal plant model is:

$$x(k+1) = Ax(k) + Bu(k) \qquad \text{(Eq. 19a)}$$

$$y(k) = Cx(k) \qquad \text{(Eq. 19b)}$$

Applying the input and output plant model adaptive factor arrays 82 yields:

$$x(k+1) = Ax(k) + K_{pmE}^{IN} \cdot * K_{pX}^{IN} \cdot * Bu(k) + K_{pmE}^{IN} \cdot * K_{kd}^{IN} \cdot * Bu_{kd}(k) \qquad \text{(Eq. 20a)}$$
$$= Ax(k) + B_a u(k) + B_{kd} u_{kd}(k)$$

$$y(k) = K_{pmE}^{OUT} \cdot * K_{pX}^{OUT} \cdot * Cx(k) = C_a x(k) \qquad \text{(Eq. 20b)}$$

Using LQR control, the resulted augmented adaptive incremental model for optimal control is:

$$z(k+1) = \begin{bmatrix} A & 0 \\ C_a A & I \end{bmatrix} z(k) + \begin{bmatrix} B_a \\ C_a B_a \end{bmatrix} \hat{u}(k) + \begin{bmatrix} B_{kd} \\ C_a B_{kd} \end{bmatrix} \hat{u}_{kd}(k) \qquad \text{(Eq. 21a)}$$

Treat $\hat{u}_{kd}(k)$ as constant state represented by 1, $z(k) = [\hat{x}(k) \; e_y(k) \; 1]^T$ then the augmented adaptive incremental model is:

$$z(k+1) = \begin{bmatrix} A & 0 & B_{kd}\hat{u}_{kd}(k) \\ C_a A & I & C_a B_{kd}\hat{u}_{kd}(k) \\ 0 & 0 & I \end{bmatrix} z(k) + \begin{bmatrix} B_a \\ C_a B_a \\ 0 \end{bmatrix} \hat{u}(k) = \qquad \text{(Eq. 21b)}$$
$$A_{cA} z(k) + B_{cA} \hat{u}(k)$$

Using dynamic inversion control, from (Eq. 5) the nominal plant model is:

$$\hat{x}(k+1) = A\hat{x}(k) + B\hat{u}(k) + B_d \hat{d}(k) \qquad \text{(Eq. 22a)}$$

$$\hat{y}(k) = C\hat{x}(k) + D_d \hat{d}(k) \qquad \text{(Eq. 22b)}$$

The nominal plant response is:

$$\hat{y}(k+2) = (CAB)\hat{u}(k) + \hat{y}^{pf}(k) = E\hat{u}(k) + \hat{y}^{pf}(k) \qquad \text{(Eq. 23)}$$

And the free response is:

$$\hat{y}^{pf}(k) = CA^2 \hat{x}(k) + (C(AB_d + B_d) + 2D_d)\hat{d}(k) \qquad \text{(Eq. 24)}$$
$$= k_x^{pf}(C, A)\hat{x}(k) + k_d^{pf}(C, A, B_d, D_d)\hat{d}(k)$$

Applying the input and output plant model adaptive factor arrays 82 to input matrix B and output matrix C yields the generic adaptive model:

$$\hat{x}(k+1) = A\hat{x}(k) + K_{pmE}^{IN} \cdot * K_{pX}^{IN} \cdot * B\hat{u}(k) + B_d \hat{d}(k) \qquad \text{(Eq. 25a)}$$
$$= A\hat{x}(k) + B_a \hat{u}(k) + B_d \hat{d}(k)$$

$$\hat{y}(k) = K_{pmE}^{OUT} \cdot * K_{pX}^{OUT} \cdot * C\hat{x}(k) + D_d \hat{d}(k) = C_a \hat{x}(k) + D_d \hat{d}(k) \qquad \text{(Eq. 25b)}$$

Using dynamic inversion model-based control and assuming that all output have a relative degree of 2, from (Eq. 10), the plant response is:

$$\hat{y}(k+2) = (C_a AB_a)\hat{u}(k) + \hat{y}_a^{pf}(k) + (C_a^{KD} AB_a^{KD})\hat{u}_{kd}(k) \qquad \text{(Eq. 26)}$$
$$= E_a \hat{u}(k) + \hat{y}_a^{pf}(k) + E_{kd} \hat{u}_{kd}(k)$$

Where $B_a^{KD} = K_{pmE}^{IN} \cdot * K_{kd}^{IN} \cdot * B$, $KK_{kd}^{IN}$ has the same dimensions as B, $C_a^{KD} = K_{pmE}^{OUT} \cdot * K_{kd}^{OUT} \cdot * C$, and $K_{kd}^{OUT}$ has the same dimensions as C.

$E_a = C_a AB_a$ forms the remaining reduced order MIMO plant input-output mapping model from which the actuator in a non-free moving mode is separated. $E_{kd} = C_a^{KD} AB_a^{KD}$ describes the contribution of the actuator in a non-free moving mode to each output of the remaining reduced order MIMO system. $\hat{u}_{kd}$ stands for the actuator input in a non-free moving mode separated from the remaining $\hat{u}$ but acting as a known disturbance input to the remaining MIMO controlled plant. The free response is:

$$\hat{y}_a^{pf}(k) = C_a A^2 \hat{x}(k) + (C_a(AB_d + B_d) + 2D_d)\hat{d}(k) \qquad \text{(Eq. 27)}$$
$$= k_x^{pf}(C_a, A)\hat{x}(k) + k_d^{pf}(C_a, A, B_d, D_d)\hat{d}(k)$$

In the specific method for dynamic inversion based decoupling control, the plant model adaptive factor arrays 82 are applied to the decoupling matrix E such that the adaptive plant model 41 can represent the actuators 21 current mode changes and the output priority transitions in the input response. It follows that the resulted model-based control can automatically inherit the plant changes captured by the adaptive plant model 41 with the adaptive decoupling matrix E. This specific method applies dynamic inversion type model-based control where the decoupling matrix has a full set of dominate pairs.

By applying the input and output plant model adaptive factor arrays 82 to the plant input response instead of the original plant model input matrix and output matrix, i.e. from (Eq. 23), the nominal plant response is augmented into the adaptive plant response as:

(Eq. 28)
$$\hat{y}(k+2) = K_{pmE}^{IO} \cdot * K_{pX}^{IO} \cdot * E * \hat{u}(k) + \hat{y}^{pf}(k) + K_{pmE}^{IO} \cdot * K_{kd}^{IO} \cdot * E * \hat{u}(k)$$
$$= E_a * \hat{u}(k) + \hat{y}^{pf}(k) + E_{kd} \hat{u}_{kd}(k)$$

Where $E_a = K_{pmE}^{IO} \cdot * K_{pX}^{IO} \cdot * E$, and $E_{kd} = K_{pmE}^{IO} \cdot * K_{kd}^{IO} \cdot * E$.

$E_a$ forms the remaining reduced order MIMO plant I/O mapping model from which the actuator in a non-freeing moving mode is separated. $E_{kd}$ describes the contribution of the actuator in a non-free moving mode to each output remaining in the reduced order MIMO system. $\hat{u}_{kd}$ stands for the actuator input in a non-free moving mode separated from the remaining $\hat{u}$.

From (Eq. 28), the output matrix C does not have an adaptive factor in the free response. The free response is still the same as the free response in the nominal case. This certain model-plant mismatch error may be neglectable for the specific adaptive model method if the plant has zero-dynamics stability and a full-set of dominant pairs.

It is important to assure a smooth transition of the adaptive decoupling control with an actuators mode transition between a free-moving and a non-free moving mode. An actuator mode transition means that the actuator is transitioned from being in a nominal MIMO control to being separated from the remaining MIMO control, or vice versa.

In order to have an adaptive model-based control smooth transition, the separation of an input-output pair should assure that the input and output in the target pair do not impact any of the inputs and outputs in the remaining MIMO control when separated from the remaining MIMO control. Also, the input and output in the target pair should start interacting with each other and the rest of the inputs and outputs of the MIMO control as in nominal operating conditions when the target pair is brought back to the MIMO control.

For dynamic inversion type model-based control, the main concern of the control smooth transition is the transition between the $E_a$ and E because E or $E_a$ are at a denominator position. On the one hand, $E_a$ should have a proper initial condition for the separated input-output pair such that when the pair is brought to the MIMO control, $E_a$ can smoothly transition to E for nominal operating.

The adaptive dynamic inversion type decoupling control smooth transition is achieved in the way that, at the last step of the adaptive plant model 41 on-line reconfiguration, when the pair of the non-free moving actuator and the current lowest priority output are separated from the remaining MIMO control, the relation between the input and output in the separated pair is calculated in the input-output mapping or decoupling matrix based on nominal model calculations for the dynamic inversion type model-based control. Conversely, the input in the separated pair is calculated for non-dynamic inversion type model-based control based on nominal model such that when the separated input-output pair is brought back to the MIMO control, it has the correct initial condition to connect to.

The separation assures that the remaining MIMO control is not impacted by the kept relation of the target input-output pair in the input-output decoupling matrix. Furthermore, this kept term not only prepares the correct initial condition for the target input-output pair to be brought back to the MIMO control but also keeps the invertibility of the decoupling matrix.

Keeping the relation of the separated input-output pair in $E_a$ or keeping calculation of the input of the separated input-output pair does not mean that the input in the separated pair still controls the output in the separated pair via this term in the adaptive model-based control provided for herein. The incremental input in the separated pair is equal to 0 (fixed mode) or uses the incremental scheduled reference signal (quasi-free moving mode) to control the output in the separated pair during separation.

In the following example, the same 4×4 plant is used as the aforementioned examples, assuming actuator number 2 is in a non-free moving mode, that output 4 has the lowest priority, that all outputs have a relative degree of 2 and that the model error flag 72 is 0.

For the dynamic inversion type model-based control, the nominal plant model response for dynamic inversion decoupling control is:

$$\hat{y}(k+2) = E\hat{u}(k) + \hat{y}^{pf}(k) \qquad \text{(Eq. 34)}$$

Where:

$$E = CAB = \begin{bmatrix} C_{R1}\sum_{j=1}^{5}A_{Cj}b_{j1} & C_{R1}\sum_{j=1}^{5}A_{Cj}b_{j2} & C_{R1}\sum_{j=1}^{5}A_{Cj}b_{j3} & C_{R1}\sum_{j=1}^{5}A_{Cj}b_{j4} \\ C_{R2}\sum_{j=1}^{5}A_{Cj}b_{j1} & C_{R2}\sum_{j=1}^{5}A_{Cj}b_{j2} & C_{R2}\sum_{j=1}^{5}A_{Cj}b_{j3} & C_{R2}\sum_{j=1}^{5}A_{Cj}b_{j4} \\ C_{R3}\sum_{j=1}^{5}A_{Cj}b_{j1} & C_{R3}\sum_{j=1}^{5}A_{Cj}b_{j2} & C_{R3}\sum_{j=1}^{5}A_{Cj}b_{j3} & C_{R3}\sum_{j=1}^{5}A_{Cj}b_{j4} \\ C_{R4}\sum_{j=1}^{5}A_{Cj}b_{j1} & C_{R4}\sum_{j=1}^{5}A_{Cj}b_{j2} & C_{R4}\sum_{j=1}^{5}A_{Cj}b_{j3} & C_{R4}\sum_{j=1}^{5}A_{Cj}b_{j4} \end{bmatrix}$$

$$= \begin{bmatrix} e_{11} & e_{12} & e_{13} & e_{14} \\ e_{21} & e_{22} & e_{23} & e_{24} \\ e_{31} & e_{32} & e_{33} & e_{34} \\ e_{41} & e_{42} & e_{43} & e_{44} \end{bmatrix}$$

The adaptive plant response for decoupling control from the generic method is:

$$\hat{y}(k+2) = E_a\hat{u}(k) + \hat{y}_a^{pf}(k) + E_{kd}\hat{u}_{kd}(k) \qquad \text{(Eq. 35)}$$

Where:

$$E_a = C_a A B_a = (K_{pmE}^{OUT} \cdot * K_{pX}^{OUT} \cdot * C) *$$

-continued $$A*(K_{pmE}^{IN}.*K_{pX}^{IN}.*B) = \begin{bmatrix} e_{11} & 0 & e_{13} & e_{14} \\ e_{21} & 0 & e_{23} & e_{24} \\ e_{31} & 0 & e_{33} & e_{34} \\ 0 & 0 & 0 & 0 \end{bmatrix};$$

$$E_{kd} = C_a^{KD} A B_a^{KD} = (K_{pmE}^{OUT}.*K_{kd}^{OUT}.*C)*A*$$

$$(K_{pmE}^{IN}.*K_{kd}^{IN}.*B) = \begin{bmatrix} 0 & e_{12} & 0 & 0 \\ 0 & e_{22} & 0 & 0 \\ 0 & e_{32} & 0 & 0 \\ 0 & 0 & 0 & 0 \end{bmatrix};$$

and

Where $E_a$ has reduced rank and is not invertible.

The adaptive decoupling control from the specific method is:

$$\hat{y}(k+2) = E_a \hat{u}(k) + \hat{y}^{pf}(k) + E_{kd} \hat{u}_{kd}(k) \quad \text{(Eq. 36)}$$

Where:

$$E_a = K_{pmE}^{IO}.*K_{pX}^{IO}.*E = \begin{bmatrix} e_{11} & 0 & e_{13} & e_{14} \\ e_{21} & 0 & e_{23} & e_{24} \\ e_{31} & 0 & e_{33} & e_{34} \\ 0 & 0 & 0 & 0 \end{bmatrix};$$

$$E_{kd} = K_{pmE}^{IO}.*K_{kd}^{IO}.*E = \begin{bmatrix} 0 & e_{12} & 0 & 0 \\ 0 & e_{22} & 0 & 0 \\ 0 & e_{32} & 0 & 0 \\ 0 & 0 & 0 & 0 \end{bmatrix};$$

and

Where $E_a$ has a reduced rank and is not invertible.

The last step of the adaptive dynamic inversion decoupling control reconfiguration is to introduce the nominal value $e_{42}$ to $E_a$ such that a smooth transition is achieved there through and so that $E_a$ is now invertible, noted as:

$$E_a^{SCT} = \begin{bmatrix} e_{11} & 0 & e_{13} & e_{14} \\ e_{21} & 0 & e_{23} & e_{24} \\ e_{31} & 0 & e_{33} & e_{34} \\ 0 & e_{42} & 0 & 0 \end{bmatrix} \quad \text{(Eq. 37)}$$

Where $e_{42} = C_{R4} \Sigma_{j-1}^{5} A_{Cj} b_{j2}$ includes all relations that the separated input-output pairs need to act in the nominal operating condition and continues to be updated.

In general, $E_a^{SCT}$ is determined based on $E_a$ and the nominal value of $e_{i,j}$ of the separated input-output pair $(u_j, y_i)$, $e_{i,j} = C_{Ri} \Sigma_{m-1}^{5} A_{Cm} b_{m,j}$ and used for generating the adaptive dynamics inversion type model based control.

When using a LQR design for generating the model-based control, from (Eq. 16), the generic optimal control for nominal operating condition is:

$$\hat{u}(k) = -\left(R + \begin{bmatrix} B \\ CB \end{bmatrix}^T P \begin{bmatrix} B \\ CB \end{bmatrix}\right)^{-1} \begin{bmatrix} B \\ CB \end{bmatrix}^T P \begin{bmatrix} A & 0 \\ CA & I \end{bmatrix} z(k) \quad \text{(Eq. 38)}$$

Because the weighting matrix $R = R^T > 0$, there is no concern on the invertiblity of the term $$\left(R + \begin{bmatrix} B \\ CB \end{bmatrix}^T P \begin{bmatrix} B \\ CB \end{bmatrix}\right) \text{ if } \left(\begin{bmatrix} B \\ CB \end{bmatrix}^T P \begin{bmatrix} B \\ CB \end{bmatrix}\right)$$

has rank loss.

For example, in a 2×2 plant having two actuator modes wherein actuator number 2 is in the non-free moving mode, output 2 has the lowest priority and the model error flag is 0, the plant model adaptive factor array 82 are applied to B and C, such that:

$$B_a = K_{pmE}^{IN}.*K_{pX}^{IN}.*B = \begin{bmatrix} b_{11} & 0 \\ b_{21} & 0 \end{bmatrix} \text{ and}$$

$$C_a = K_{pmE}^{OUT}.*K_{pX}^{OUT}.*C = \begin{bmatrix} c_{11} & c_{12} \\ 0 & 0 \end{bmatrix}$$

Where $\hat{u}_1$ is calculated based on the above adaptive model to control the remaining plant after separation. At the same time, $\hat{u}_2$ is calculated based on the nominal model during separation to be used as the initial condition when $\hat{u}_2$ and $\hat{y}_2$ are brought back into the MIMO control.

In a generic method for any model-based control, the plant model adaptive factor arrays 82 are applied to the input matrix B and the output matrix C such that the adaptive plant model 41 can represent the concise actuator current mode changes and the intended output priority transition completely. It follows that the resulted model-based control can automatically inherit the plant changes captured by the adaptive plant model 41 with the adaptive $B_a$ and $C_a$. This generic method applies to any model-based control.

When using a LQR design for generating the model-based control, from (Eq. 16), the generic optimal control for nominal operating condition is augmented to be the generic adaptive optimal control based on the adaptive plant model 41, and:

$$\hat{u}(k) = -\left(R + \begin{bmatrix} B_a \\ C_a B_a \\ 0 \end{bmatrix}^T P_a \begin{bmatrix} B_a \\ C_a B_a \\ 0 \end{bmatrix}\right)^{-1} \begin{bmatrix} B_a \\ C_a B_a \\ 0 \end{bmatrix}^T \quad \text{(Eq. 39a)}$$

$$P_a \begin{bmatrix} A & 0 & B_{kd} \hat{u}_{kd}(k) \\ C_a A & I & C_a B_{kd} \hat{u}_{kd}(k) \\ 0 & 0 & I \end{bmatrix} z(k)$$

$$P_a = Q + A_{cA}^T P_a [I - B_{cA}(R + B_{cA}^T P_a B_{cA})^{-1} B_{cA}^T P_a] A_{cA} \quad \text{(Eq. 39b)}$$

Where $B_a = K_{pmE}^{IN}.*K_{pX}^{IN}.*B$, $B_{kd} = K_{pmE}^{IN}.*K_{kd}^{IN}.*B$ and $C_a = K_{pmE}^{OUT}.*K_{pX}^{OUT}.*C$ are determined based on the different plant change cases presented.

When using a dynamic inversion decoupling design for generating the model-based control, the nominal plant response is:

$$\hat{y}(k+2) = E \hat{u}(k) + \hat{y}^{pf}(k), \quad E = (CAB) \quad \text{(Eq. 40)}$$

The nominal free response is:

$$\hat{y}^{pf}(k) = CA^2\hat{x}(k) + (C(A+I)B_d + 2D_d)\hat{d}(k) \quad \text{(Eq. 41)}$$
$$= k_x^{pf}(C, A)\hat{x}(k) + k_d^{pf}(C, A, B_d, D_d)\hat{d}(k)$$

The nominal desired decoupled plant response is:

$$\hat{y}(k+2) = K_v(\lambda)v(k) - (k_1\hat{y}(k+1) + k_0\hat{y}(k)) \quad \text{(Eq. 42)}$$
$$= K_v(\lambda)v(k) - \frac{(k_1(CA\hat{x}(k) + (CB_d + D_d)\hat{d}(k)) +}{k_0(C\hat{x}(k) + D_d\hat{d}(k)))}$$
$$= K_v(\lambda)v(k) - \frac{(C(k_1A + k_0I)\hat{x}(k) +}{(k_1CB_d + (k_1 + k_0)D_d)\hat{d}(k)}$$
$$= K_v(\lambda)v(k) - k_x^D(\lambda, C, A)\hat{x}(k) + k_x^D(\lambda, C, A, B_d, D_d)\hat{d}(k)$$

The nominal dynamic inversion decoupling control is:

$$u(k) = E^{-1}(K_v v(k) + K_x \hat{x}(k) + K_d \hat{d}(k)) \quad \text{(Eq. 43)}$$

In a generic method of dynamic inversion type model-based control, applying the plant model adaptive factor arrays 82 to the plant nominal response, the plant free response, and the decoupled plant desired response yields the following adaptive responses:

$$\hat{y}(k+2) = E_a\hat{u}(k) + \hat{y}_a^{pf} + E_{kd}\hat{u}_{kd}(k) \quad \text{(Eq. 22)}$$

Where $E_a = (C_a AB_a)$, $E_{kd} = (C_a^{KD} AB_a^{KD})$, and $\hat{u}_{kd}$ is the input in the separation pair.

$$\hat{y}_a^{pf}(k) = C_a A^2 \hat{x}(k) + (C_a(A+I)B_d + 2D_d)\hat{d}(k) \quad \text{(Eq. 45)}$$
$$= k_x^{pf}(C_a, A)\hat{x}(k) + k_d^{pf}(C_a, A, B_d, D_d)\hat{d}(k)$$

$$\hat{y}(k+2) = K_v(\lambda)v(k) - (k_1\hat{y}(k+1) + k_0\hat{y}(k)) \quad \text{(Eq. 46)}$$
$$= K_v(\lambda)v(k) - \frac{(C_a(k_1A + k_0I)\hat{x}(k) +}{(k_1 C_a B_d + (k_1 + k_0)D_d)\hat{d}(k)}$$
$$= K_v(\lambda)v(k) - k_x^D(\lambda, C_a, A)\hat{x}(k) + k_x^D(\lambda, C_a, A, B_d, D_d)\hat{d}(k)$$

From the above adaptive responses (Eq. 44), (Eq. 45), and (Eq. 46) and the smooth control transition, the generic adaptive dynamic inversion type decoupling control based on the adaptive plant model 41 is:

$$\hat{u}(k) = (E_a^{SCT})^{-1}\frac{[(K_v v(k) + K_x \hat{x}(k) + K_d \hat{d}(k)) -}{(C_a^{KD} AB_a^{KD})\hat{u}_{kd}(k)]} \quad \text{(Eq. 47)}$$
$$= (E_a^{SCT})^{-1}\frac{[(K_v v(k) + K_{xa}\hat{x}(k) + K_{da}\hat{d}(k)) -}{E_{kd}\hat{u}_{kd}(k)]}$$

Where $K_{xa} = -C_a(A^2 + k_1 A + k_0 I)$,
$K_{da} = -[C_a(AB_d + (1*I + k_1)B_d) + (2*I + k_1 + k_0)D_d)]$,
$B_a = K_{pmE}^{IN} . * K_{pX}^{IN} . * B$,
$C_a = K_{pmE}^{OUT} . * K_{pX}^{OUT} . * C$,
$B_a^{KD} = K_{pmE}^{IN} . * K_{pX}^{IN} . * B$, and $C_a^{KD} = K_{pmE}^{OUT} . * K_{kd}^{OUT} . * C$ are determined based on the different predetermined plant change cases and $E_a^{SCT}$ is determined based on the $E_a$ and the nominal value $e_{i,j}$ of the separated input-output pair $(u_j, y_i)$.

For dynamic inversion type model-based control, it is important to understand that on one hand the control input matrix B is only involved with the input-output decoupling matrix E, which means that any model changes caused by inputs status changes can be represented by the input matrix B and B only, and the dynamic inversion decoupling control can completely adapt to this kind of changes through the decoupling matrix E and E only. On the other hand, the outputs priority transitions are represented by the output matrix C, and C is part of E. It follows that the outputs priority transitions are also expressed by E. In fact, E represents the plant input-output mapping directly and it not only determines the input-output decoupling but also results in the input response of the plant. C is also acting in the plant free response in (Eq. 9) and the plant desired response in (Eq. 13), (Eq. 6) and (Eq. 5b)), where it is the left-side coefficient of the state feedback gain and the disturbance rejection gain, which means that C also has a certain impact on the free response cancellation and the disturbance rejection, and thereafter the desired plant dynamics shaping. Therefore, if the plant model adaptive factor arrays 82 are built through B and C, then the plant changes are completely characterized by the adaptive plant model 41. It follows that the resulted model-based decoupling control adapting to the plant changes is always consistent with the adaptive plant model 41 representing the plant changes. If the plant model adaptive factor arrays 82 are built through E, then the plant changes are mainly characterized by the adaptive plant model 41 through E. However, there are residuals from the non-exact free response cancellation and the non-exact disturbance rejection because C does not adapt to output priority transitions as E does. Therefore, the performance of the resulted model-based decoupling control adapting to the plant changes is dependent on the impact of the residuals of the free response cancellation and the disturbance rejection on the total plant response.

The residuals from the free response cancellation in the specific method may not impact the control system stability, particularly, when the system has zero-dynamic stability, however, they may weaken the decoupling effectiveness of the resulted model-based control. If the plant input-output mapping matrix has a full set of dominant pairs, then the residuals from the free response cancellation on the system control performance may be neglectable, otherwise, the residuals may have a non-neglectable impact on system control performance.

The advantage of this specific method is the simplicity of the adaptive plant model 41 on-line reconfiguration and control reconfiguration implementation.

When the output priority transitions are neglected, the nominal plant free response and the nominal decoupled plant desired response are still used for the specific adaptive dynamics inversion type decoupling control such that the plant input response is based on the adaptive model:

$$\hat{y}(k+2) = E_a\hat{u}(k) + \hat{y}^{pf} + E_{kd}\hat{u}_{kd}(k),$$
$$\hat{y}^{pf}(k) = CA^2\hat{x}(k) + (C(A+I)B_d + 2D_d)\hat{d}(k)$$
$$= k_x^{Pf}(C, A)\hat{x}(k) + k_d^{Pf}(C, A, B_d, D_d)\hat{d}(k),$$
$$\hat{y}(k+2) = K_v(\lambda)v(k) - \frac{(C(k_1A + k_0I)\hat{x}(k) +}{(k_1CB_d + (k_1 + k_0)D_d)\hat{d}(k)}$$
$$= K_v(\lambda)v(k) - k_x^D(\lambda, C, A)\hat{x}(k) + k_x^D(\lambda, C, A, B_d, D_d)\hat{d}(k)$$

The resulted specific adaptive dynamics inversion type decoupling control is:

$$\hat{u}(k)=(E_a^{SCT})^{-1}[(K_v v(k)+K_{xa}\hat{x}(k)+K_{da}\hat{d}(k))-E_{kd}\hat{u}_{kd}(k)] \quad \text{(Eq. 48)}$$

Where $K_x=C(A^2+k_1A+k_0I)$, $K_d=-[C(AB_d+(1*I+k_1)B_d)+(2*I+k_1+k_0)D_d)]$ and where $E_a=K_{pmE}^{IO}*K_{pX}^{IO}*E$ and $E_{kd}=K_{pmE}^{IO}*K_{kd}^{IO}*E$ are determined based on the different predetermined plant change cases, as shown in the subsequent examples, and $E_a^{SCT}$ is determined based on the $E_a$ and the nominal value $e_{i,j}$ of the separated input-output pair $(u_j, y_i)$.

Figure 4A:
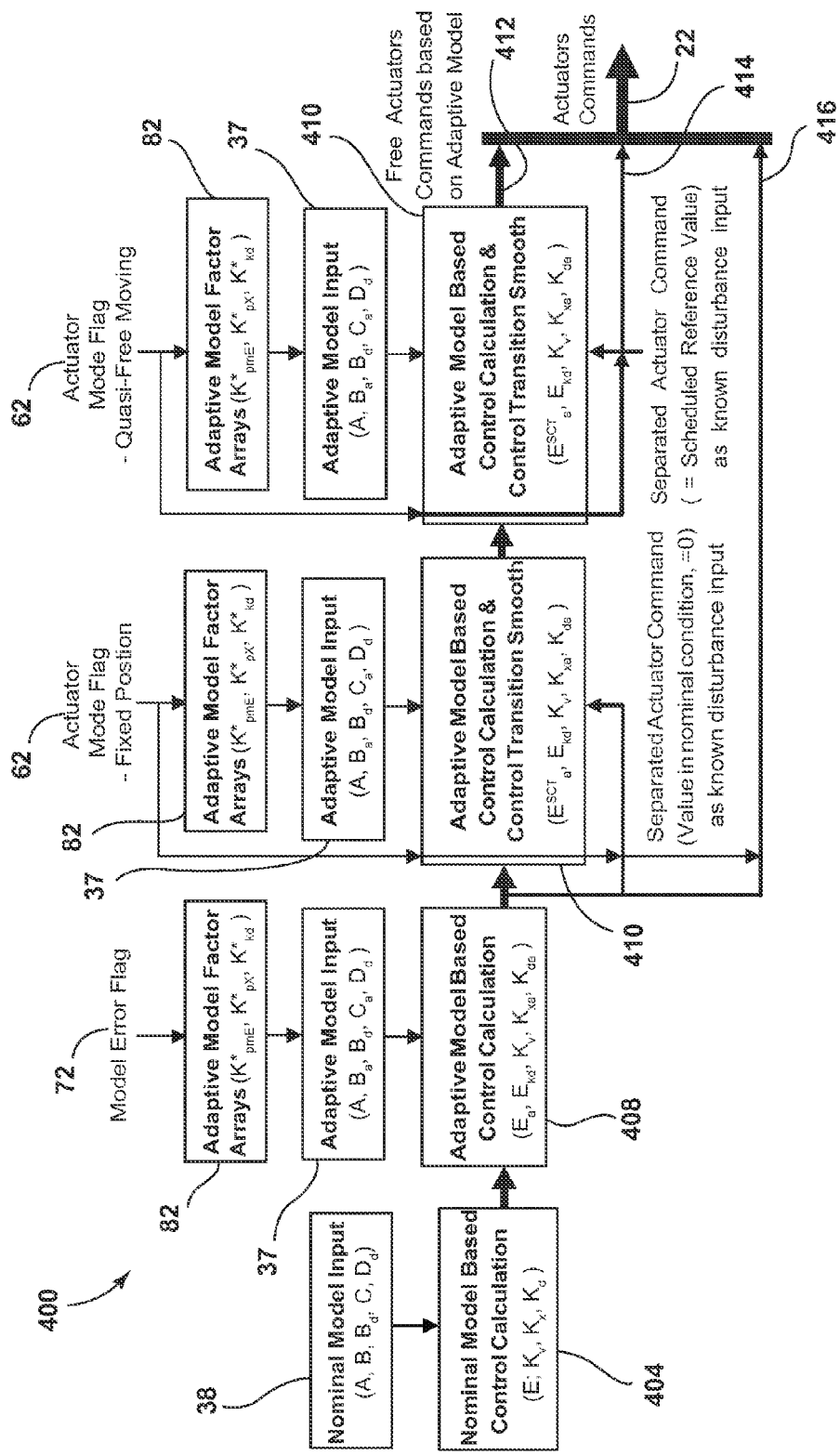
FIG. 4A is a block diagram representation of adaptive model based control module logic for dynamic inversion type control according to an embodiment of the invention.
Figure 4B:
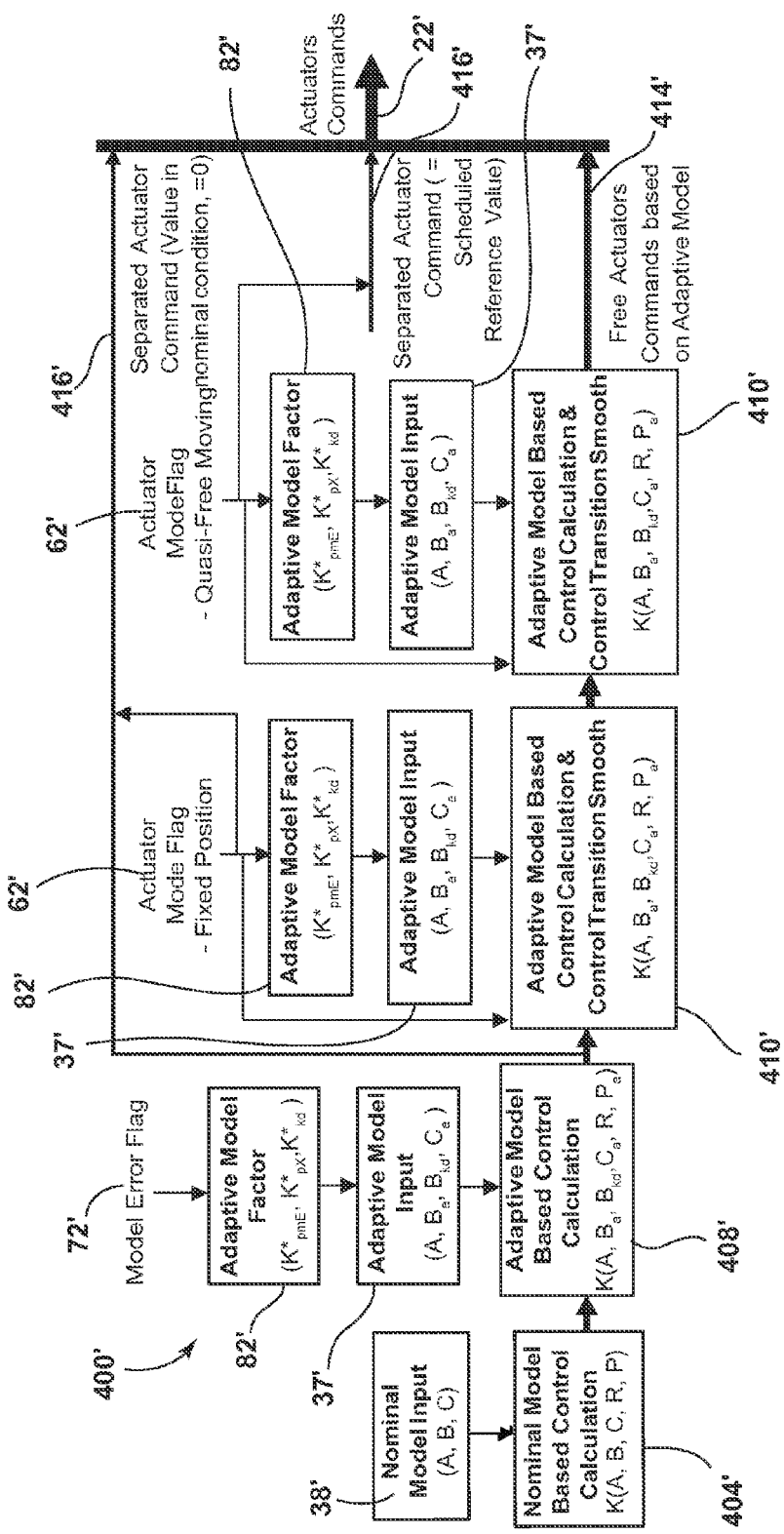
FIG. 4B is a block diagram representation of adaptive model based control module logic for non-dynamic inversion type control according to an embodiment of the invention.

FIG. 4A illustrates an adaptive model-based control decision maker 400 for dynamic inversion type model-based control and FIG. 4B illustrates an adaptive model-based control decision maker 400' for non-dynamic inversion type model-based control where like elements FIG. 4A are identified with the same reference numerals and include a prime (') symbol in FIG. 4B.

The different actuator modes result in different adaptive model parameters. The adaptive model-based control decision maker 400 for dynamic inversion type model-based control needs to:

(1) Calculate the nominal control based on the nominal model input 38;
(2) Check model error flag 72. If model error flag 72 is NOT zero, calculate the adaptive control based on the adaptive model input 37; if model error flag 72 is zero, the nominal model and control is passed through directly;
(3) Check actuator mode flags 62. If an actuator mode flag 62 indicates an actuator in non-free-moving mode, this actuator associated input-output pair is separated from the MIMO control. Assure the smooth control transition by preserving the value calculation of the separated input-output pair based on nominal model and model-error adaptive model, whichever is used for the preserved value depending on model error flag indication, as the correct initial condition of the separated input when it is brought back to the MIMO control; and
(4) Calculate the adaptive control based on the adaptive model input 37 with the preserved value of the separated input-output pair and the separated input incremental value is zero for actuator in fixed mode or is equal to the scheduled reference incremental value for actuator in quasi-free moving mode and the separated input as a known disturbance input; and
(5) Organize the final actuator commands accordingly.

The adaptive model-based control decision maker 400 for dynamic inversion type model-based control, determines the plant input commands 22. The nominal model inputs 38 are used to perform nominal model-based control calculations 404 and the model error flag 72, the actuator mode flags 62, plant model adaptive factor arrays 82 and adaptive model inputs 37 are used to perform adaptive model-based control law calculations and smooth control transition 410 to determine the free actuator commands 412. The quasi-free actuator mode flag 62 is used to perform adaptive model based control calculations and smooth control transitions 410 to determine the separated actuator commands 414 having a scheduled reference value. The model error flag 72 is used to perform adaptive model based control calculations 408 to determine no separated input-output pairs. The nominal model based control calculations 404, the adaptive model based control calculations 408 and fixed mode actuator mode flag 62 are used to perform adaptive model based control calculations and smooth control transitions 410 to determine the separated actuator commands 416 having a preserved value.

The adaptive model-based control decision maker 400' for non-dynamic inversion type model-based control needs to:

(1) Calculate the nominal control based on the nominal model input 38';
(2) Check model error flag 72'. If model error flag 72' is NOT zero, calculate the adaptive control based on the adaptive model input 37'; if model error flag 72' is zero, the nominal model and control is passed through directly;
(3) Check actuator mode flags 62'. If an actuator mode flag 62' indicates an actuator in non-free-moving mode, this actuator associated input-output pair is separated from the MIMO control. Assure the smooth control transition by preserving the value calculation of the separated input-output pair based on nominal model and model-error adaptive model, whichever is used for the preserved value depending on model error flag 72' indication, as the correct initial condition of the separated input when it is brought back to the MIMO control;
(4) Calculate the adaptive control based on the adaptive model input 37' wherein the separated input incremental value is zero for actuator in fixed mode or is equal to the scheduled reference incremental value for actuator in quasi-free moving mode and the separated input is a known disturbance input; and
(5) Organize the final actuator commands accordingly.

The adaptive model-based control decision makers 400' for non-dynamic inversion type model-based control, determines the plant input commands 22'. The nominal model inputs 38' are used to perform nominal model-based control calculations 404' and the model error flag 72', actuator mode flags 62', plant model adaptive factor arrays 82' and adaptive model inputs 37' are used to perform adaptive model-based control calculations and smooth control transition 410' to determine the free actuator commands 412'. The quasi-free actuator mode flag 62' determines the separated actuator command 414' having a scheduled reference value. The model error flag 72 is used to perform adaptive model based control calculations 408' to determine no separated input-output pairs. The nominal model based control calculations 404', the adaptive model based control calculations 408' and fixed mode actuator mode flag 62' determine the separated actuator commands 416' having a preserved value.

Modeling error is taken care of by the adaptive plant model (FIG. 1) reconfiguration alone. The model-based control simply inherits the plant model adaptive factor arrays 82, 82' from adaptive plant model (FIG. 1), and the control does not need to take additional actions except for performing adaptive model based control calculations.

Referring again to FIG. 1, in the following examples, without loss of generality, assume that the controlled plant has 4 control actuators as inputs $u_1$=Act1, $u_2$=Act2, $u_3$=Act3, to $u_4$=Act4, 5 states, 4 outputs with predetermined output priority rankings $y_1$=highest, $y_2$=second, $y_3$=third, $y_4$=lowest, all outputs have a relative degree of 2, and dominant pairs are given as: $(u_1, y_1)$, $(u_2, y_2)$, $(u_3, y_3)$ and $(u_4, y_4)$.

The following examples are illustrated using specific dynamic inversion type model-based control for simple formulation. However, it will be understood that the application process of the rules for different cases demonstrated in the following examples applies to the generic adaptive model-based control for the dynamic inversion type and non-dynamic inversion type.

In the case 1 wherein the actuator current mode is in the fixed mode, the following example illustrates setting the model adaptive factor array $K_{pX}^{IO}$ as the actuator status transitions. Assuming an actuator current mode transition sequence as: first at nominal mode, then Act2 is fixed, then both Act2 and Act3 are fixed, then Act2 is back to free moving; the model adaptive factor arrays 82 have the following transition:

$$K_{pX}^{IO} = \begin{bmatrix} 1 & 1 & 1 & 1 \\ 1 & 1 & 1 & 1 \\ 1 & 1 & 1 & 1 \\ 1 & 1 & 1 & 1 \end{bmatrix} \Rightarrow \begin{bmatrix} 1 & 0 & 1 & 1 \\ 1 & 0 & 1 & 1 \\ 1 & 0 & 1 & 1 \\ 0 & 0 & 0 & 0 \end{bmatrix} \Rightarrow \begin{bmatrix} 1 & 0 & 0 & 1 \\ 1 & 0 & 0 & 1 \\ 0 & 0 & 0 & 0 \\ 0 & 0 & 0 & 0 \end{bmatrix} \Rightarrow \begin{bmatrix} 1 & 1 & 0 & 1 \\ 1 & 1 & 0 & 1 \\ 1 & 1 & 0 & 1 \\ 0 & 0 & 0 & 0 \end{bmatrix};$$

and $$K_{kd}^{IO} = \begin{bmatrix} 0 & 0 & 0 & 0 \\ 0 & 0 & 0 & 0 \\ 0 & 0 & 0 & 0 \\ 0 & 0 & 0 & 0 \end{bmatrix} \Rightarrow \begin{bmatrix} 0 & 1 & 0 & 0 \\ 0 & 1 & 0 & 0 \\ 0 & 1 & 0 & 0 \\ 0 & 0 & 0 & 0 \end{bmatrix} \Rightarrow \begin{bmatrix} 0 & 1 & 1 & 0 \\ 0 & 1 & 1 & 0 \\ 0 & 0 & 0 & 0 \\ 0 & 0 & 0 & 0 \end{bmatrix} \Rightarrow \begin{bmatrix} 0 & 0 & 1 & 0 \\ 0 & 0 & 1 & 0 \\ 0 & 0 & 1 & 0 \\ 0 & 0 & 0 & 0 \end{bmatrix}$$

The resulted adaptive model parameters are:

$$E_a = \begin{bmatrix} e_{11} & e_{12} & e_{13} & e_{14} \\ e_{21} & e_{22} & e_{23} & e_{24} \\ e_{31} & e_{32} & e_{33} & e_{34} \\ e_{41} & e_{42} & e_{43} & e_{44} \end{bmatrix} \Rightarrow \begin{bmatrix} e_{11} & 0 & e_{13} & e_{14} \\ e_{21} & 0 & e_{23} & e_{24} \\ e_{31} & 0 & e_{33} & e_{34} \\ 0 & 0 & 0 & 0 \end{bmatrix} \Rightarrow \begin{bmatrix} e_{11} & 0 & 0 & e_{14} \\ e_{21} & 0 & 0 & e_{24} \\ 0 & 0 & 0 & 0 \\ 0 & 0 & 0 & 0 \end{bmatrix} \Rightarrow$$

$$\begin{bmatrix} e_{11} & e_{12} & 0 & e_{14} \\ e_{21} & e_{22} & 0 & e_{24} \\ e_{31} & e_{32} & 0 & e_{34} \\ 0 & 0 & 0 & 0 \end{bmatrix}$$

For on-limit case:

$$E_{kd} = \begin{bmatrix} 0 & 0 & 0 & 0 \\ 0 & 0 & 0 & 0 \\ 0 & 0 & 0 & 0 \\ 0 & 0 & 0 & 0 \end{bmatrix} \Rightarrow \begin{bmatrix} 0 & e_{12} & 0 & 0 \\ 0 & e_{22} & 0 & 0 \\ 0 & e_{32} & 0 & 0 \\ 0 & 0 & 0 & 0 \end{bmatrix} \Rightarrow \begin{bmatrix} 0 & 0 & e_{13} & 0 \\ 0 & 0 & e_{23} & 0 \\ 0 & 0 & e_{33} & 0 \\ 0 & 0 & 0 & 0 \end{bmatrix} \Rightarrow$$

$$\begin{bmatrix} 0 & 0 & e_{13} & 0 \\ 0 & 0 & e_{23} & 0 \\ 0 & 0 & e_{33} & 0 \\ 0 & 0 & 0 & 0 \end{bmatrix}$$

For failure case:

$$E_{kd} = \begin{bmatrix} 0 & 0 & 0 & 0 \\ 0 & 0 & 0 & 0 \\ 0 & 0 & 0 & 0 \\ 0 & 0 & 0 & 0 \end{bmatrix} \Rightarrow \begin{bmatrix} 0 & 0 & 0 & 0 \\ 0 & 0 & 0 & 0 \\ 0 & 0 & 0 & 0 \\ 0 & 0 & 0 & 0 \end{bmatrix} \Rightarrow \begin{bmatrix} 0 & 0 & 0 & 0 \\ 0 & 0 & 0 & 0 \\ 0 & 0 & 0 & 0 \\ 0 & 0 & 0 & 0 \end{bmatrix} \Rightarrow \begin{bmatrix} 0 & 0 & 0 & 0 \\ 0 & 0 & 0 & 0 \\ 0 & 0 & 0 & 0 \\ 0 & 0 & 0 & 0 \end{bmatrix}$$

Applying the smooth control transition rule to $E_a$ yields:

$$E_a^{SCT} = \begin{bmatrix} e_{11} & e_{12} & e_{13} & e_{14} \\ e_{21} & e_{22} & e_{23} & e_{24} \\ e_{31} & e_{32} & e_{33} & e_{34} \\ e_{41} & e_{42} & e_{43} & e_{44} \end{bmatrix} \Rightarrow \begin{bmatrix} e_{11} & 0 & e_{13} & e_{14} \\ e_{21} & 0 & e_{23} & e_{24} \\ e_{31} & 0 & e_{33} & e_{34} \\ 0 & e_{42} & 0 & 0 \end{bmatrix} \Rightarrow$$

$$\begin{bmatrix} e_{11} & 0 & 0 & e_{14} \\ e_{21} & 0 & 0 & e_{24} \\ 0 & 0 & e_{33} & 0 \\ 0 & e_{42} & 0 & 0 \end{bmatrix} \Rightarrow \begin{bmatrix} e_{11} & e_{12} & 0 & e_{14} \\ e_{21} & e_{22} & 0 & e_{24} \\ e_{31} & e_{32} & 0 & e_{34} \\ 0 & 0 & e_{43} & 0 \end{bmatrix}$$

In the case 2 wherein the actuator current mode is in the quasi-free moving mode, the following example illustrates setting the model adaptive factor array $K_{pX}^{IO}$ as the actuator status transitions. Assuming an actuator current mode transition sequence as: first at nominal mode, then Act2 is quasi-free moving, then both Act2 and Act3 are quasi-free moving, then Act2 is back to free moving, and assuming that all the outputs have distinct priority ranks, regardless of the dominant pairs; the model adaptive factor arrays have the following transition:

$$K_{pX}^{IO} = \begin{bmatrix} 1 & 1 & 1 & 1 \\ 1 & 1 & 1 & 1 \\ 1 & 1 & 1 & 1 \\ 1 & 1 & 1 & 1 \end{bmatrix} \Rightarrow \begin{bmatrix} 1 & 0 & 1 & 1 \\ 1 & 0 & 1 & 1 \\ 1 & 0 & 1 & 1 \\ 0 & 0 & 0 & 0 \end{bmatrix} \Rightarrow \begin{bmatrix} 1 & 0 & 0 & 1 \\ 1 & 0 & 0 & 1 \\ 0 & 0 & 0 & 0 \\ 0 & 0 & 0 & 0 \end{bmatrix} \Rightarrow \begin{bmatrix} 1 & 1 & 0 & 1 \\ 1 & 1 & 0 & 1 \\ 1 & 1 & 0 & 1 \\ 0 & 0 & 0 & 0 \end{bmatrix};$$

and $$K_{kd}^{IO} = \begin{bmatrix} 0 & 0 & 0 & 0 \\ 0 & 0 & 0 & 0 \\ 0 & 0 & 0 & 0 \\ 0 & 0 & 0 & 0 \end{bmatrix} \Rightarrow \begin{bmatrix} 0 & 1 & 0 & 0 \\ 0 & 1 & 0 & 0 \\ 0 & 1 & 0 & 0 \\ 0 & 0 & 0 & 0 \end{bmatrix} \Rightarrow \begin{bmatrix} 0 & 1 & 1 & 0 \\ 0 & 1 & 1 & 0 \\ 0 & 0 & 0 & 0 \\ 0 & 0 & 0 & 0 \end{bmatrix} \Rightarrow \begin{bmatrix} 0 & 0 & 1 & 0 \\ 0 & 0 & 1 & 0 \\ 0 & 0 & 1 & 0 \\ 0 & 0 & 0 & 0 \end{bmatrix}$$

The resulted adaptive model parameters are:

$$E_a = \begin{bmatrix} e_{11} & e_{12} & e_{13} & e_{14} \\ e_{21} & e_{22} & e_{23} & e_{24} \\ e_{31} & e_{32} & e_{33} & e_{34} \\ e_{41} & e_{42} & e_{43} & e_{44} \end{bmatrix} \Rightarrow \begin{bmatrix} e_{11} & 0 & e_{13} & e_{14} \\ e_{21} & 0 & e_{23} & e_{24} \\ e_{31} & 0 & e_{33} & e_{34} \\ 0 & 0 & 0 & 0 \end{bmatrix} \Rightarrow$$

$$\begin{bmatrix} e_{11} & 0 & 0 & e_{14} \\ e_{21} & 0 & 0 & e_{24} \\ 0 & 0 & 0 & 0 \\ 0 & 0 & 0 & 0 \end{bmatrix} \Rightarrow \begin{bmatrix} e_{11} & e_{12} & 0 & e_{14} \\ e_{21} & e_{22} & 0 & e_{24} \\ e_{31} & e_{32} & 0 & e_{34} \\ 0 & 0 & 0 & 0 \end{bmatrix}$$

$$E_{kd} = \begin{bmatrix} 0 & 0 & 0 & 0 \\ 0 & 0 & 0 & 0 \\ 0 & 0 & 0 & 0 \\ 0 & 0 & 0 & 0 \end{bmatrix} \Rightarrow \begin{bmatrix} 0 & e_{12} & 0 & 0 \\ 0 & e_{22} & 0 & 0 \\ 0 & e_{32} & 0 & 0 \\ 0 & 0 & 0 & 0 \end{bmatrix} \Rightarrow \begin{bmatrix} 0 & 0 & e_{13} & 0 \\ 0 & 0 & e_{23} & 0 \\ 0 & 0 & e_{33} & 0 \\ 0 & 0 & 0 & 0 \end{bmatrix} \Rightarrow$$

$$\begin{bmatrix} 0 & 0 & e_{13} & 0 \\ 0 & 0 & e_{23} & 0 \\ 0 & 0 & e_{33} & 0 \\ 0 & 0 & 0 & 0 \end{bmatrix}$$

Applying the smooth control transition rule to $E_a$ yields:

$$E_a^{SCT} = \begin{bmatrix} e_{11} & e_{12} & e_{13} & e_{14} \\ e_{21} & e_{22} & e_{23} & e_{24} \\ e_{31} & e_{32} & e_{33} & e_{34} \\ e_{41} & e_{42} & e_{43} & e_{44} \end{bmatrix} \Rightarrow \begin{bmatrix} e_{11} & 0 & e_{13} & e_{14} \\ e_{21} & 0 & e_{23} & e_{24} \\ e_{31} & 0 & e_{33} & e_{34} \\ 0 & e_{42} & 0 & 0 \end{bmatrix} \Rightarrow$$

$$\begin{bmatrix} e_{11} & 0 & 0 & e_{14} \\ e_{21} & 0 & 0 & e_{24} \\ 0 & 0 & e_{33} & 0 \\ 0 & e_{42} & 0 & 0 \end{bmatrix} \Rightarrow \begin{bmatrix} e_{11} & e_{12} & 0 & e_{14} \\ e_{21} & e_{22} & 0 & e_{24} \\ e_{31} & e_{32} & 0 & e_{34} \\ 0 & 0 & e_{43} & 0 \end{bmatrix}$$

If $y_1$, $y_2$, $y_3$ and $y_4$ have comparable priorities, the dominant pairs should be kept as many as possible and the model adaptive factor arrays have the following transition:

$$K_{pX}^{IO} = \begin{bmatrix} 1 & 1 & 1 & 1 \\ 1 & 1 & 1 & 1 \\ 1 & 1 & 1 & 1 \\ 1 & 1 & 1 & 1 \end{bmatrix} \Rightarrow \begin{bmatrix} 1 & 0 & 1 & 1 \\ 0 & 0 & 0 & 0 \\ 1 & 0 & 1 & 1 \\ 1 & 0 & 1 & 1 \end{bmatrix} \Rightarrow \begin{bmatrix} 1 & 0 & 0 & 1 \\ 0 & 0 & 0 & 0 \\ 0 & 0 & 0 & 0 \\ 1 & 0 & 0 & 1 \end{bmatrix} \Rightarrow \begin{bmatrix} 1 & 1 & 0 & 1 \\ 1 & 1 & 0 & 1 \\ 0 & 0 & 0 & 0 \\ 1 & 1 & 0 & 1 \end{bmatrix};$$

and $$K_{kd}^{IO} = \begin{bmatrix} 0 & 0 & 0 & 0 \\ 0 & 0 & 0 & 0 \\ 0 & 0 & 0 & 0 \\ 0 & 0 & 0 & 0 \end{bmatrix} \Rightarrow \begin{bmatrix} 0 & 1 & 0 & 0 \\ 0 & 0 & 0 & 0 \\ 0 & 1 & 0 & 0 \\ 0 & 1 & 0 & 0 \end{bmatrix} \Rightarrow \begin{bmatrix} 0 & 1 & 1 & 0 \\ 0 & 0 & 0 & 0 \\ 0 & 0 & 0 & 0 \\ 0 & 1 & 1 & 0 \end{bmatrix} \Rightarrow \begin{bmatrix} 0 & 0 & 1 & 0 \\ 0 & 0 & 1 & 0 \\ 0 & 0 & 0 & 0 \\ 0 & 0 & 1 & 0 \end{bmatrix}$$

The resulted adaptive model parameters are:

$$E_a = \begin{bmatrix} e_{11} & e_{12} & e_{13} & e_{14} \\ e_{21} & e_{22} & e_{23} & e_{24} \\ e_{31} & e_{32} & e_{33} & e_{34} \\ e_{41} & e_{42} & e_{43} & e_{44} \end{bmatrix} \Rightarrow \begin{bmatrix} e_{11} & 0 & e_{13} & e_{14} \\ 0 & 0 & 0 & 0 \\ e_{31} & 0 & e_{33} & e_{34} \\ e_{41} & 0 & e_{43} & e_{44} \end{bmatrix} \Rightarrow$$

$$\begin{bmatrix} e_{11} & 0 & 0 & e_{14} \\ 0 & 0 & 0 & 0 \\ 0 & 0 & 0 & 0 \\ e_{41} & 0 & 0 & e_{44} \end{bmatrix} \Rightarrow \begin{bmatrix} e_{11} & e_{12} & 0 & e_{14} \\ e_{21} & e_{22} & 0 & e_{24} \\ 0 & 0 & 0 & 0 \\ e_{41} & e_{42} & e_{43} & e_{44} \end{bmatrix}$$

$$E_{kd} = \begin{bmatrix} 0 & 0 & 0 & 0 \\ 0 & 0 & 0 & 0 \\ 0 & 0 & 0 & 0 \\ 0 & 0 & 0 & 0 \end{bmatrix} \Rightarrow \begin{bmatrix} 0 & e_{12} & 0 & 0 \\ 0 & 0 & 0 & 0 \\ 0 & e_{32} & 0 & 0 \\ 0 & e_{42} & 0 & 0 \end{bmatrix} \Rightarrow \begin{bmatrix} 0 & e_{12} & e_{13} & 0 \\ 0 & 0 & 0 & 0 \\ 0 & 0 & 0 & 0 \\ 0 & e_{42} & e_{43} & 0 \end{bmatrix} \Rightarrow$$

$$\begin{bmatrix} 0 & 0 & e_{13} & 0 \\ 0 & 0 & e_{23} & 0 \\ 0 & 0 & 0 & 0 \\ 0 & 0 & e_{43} & 0 \end{bmatrix}$$

Applying the smooth control transition rule to $E_a$ yields:

$$E_a^{SCT} = \begin{bmatrix} e_{11} & e_{12} & e_{13} & e_{14} \\ e_{21} & e_{22} & e_{23} & e_{24} \\ e_{31} & e_{32} & e_{33} & e_{34} \\ e_{41} & e_{42} & e_{43} & e_{44} \end{bmatrix} \Rightarrow \begin{bmatrix} e_{11} & 0 & e_{13} & e_{14} \\ 0 & e_{22} & e_{23} & e_{24} \\ e_{31} & 0 & e_{33} & e_{34} \\ e_{41} & 0 & e_{43} & e_{44} \end{bmatrix} \Rightarrow$$

$$\begin{bmatrix} e_{11} & 0 & 0 & e_{14} \\ 0 & e_{22} & 0 & 0 \\ 0 & 0 & e_{33} & 0 \\ e_{41} & e_{42} & 0 & e_{44} \end{bmatrix} \Rightarrow \begin{bmatrix} e_{11} & e_{12} & 0 & e_{14} \\ e_{21} & e_{22} & 0 & e_{24} \\ 0 & 0 & e_{33} & 0 \\ e_{41} & e_{42} & 0 & e_{44} \end{bmatrix}$$

In case 3 where a known un-modeled dynamics, the following example assumes that at a low speed operating condition, actuator $u_4$ in its higher operating range has less effect on $y_4$ and $y_2$, however, the nominal linearized model resulted from $e_{44}$ is much smaller than the actual effect and $e_{24}$ is much larger than the actual interaction. Above low speed, the nominal model represents the plant dynamics well. Further assuming the operating condition transition is from high speed into low speed, then back to high speed, the model adaptive factor array transition is:

$$K_{pmE}^{IO} = \begin{bmatrix} 1 & 1 & 1 & 1 \\ 1 & 1 & 1 & 1 \\ 1 & 1 & 1 & 1 \\ 1 & 1 & 1 & 1 \end{bmatrix} \Rightarrow \begin{bmatrix} 1 & 1 & 1 & 1 \\ 1 & 1 & 1 & K_{pmE\,24}^{E} \\ 1 & 1 & 1 & 1 \\ 1 & 1 & 1 & K_{pmE\,44}^{E} \end{bmatrix} \Rightarrow \begin{bmatrix} 1 & 1 & 1 & 1 \\ 1 & 1 & 1 & 1 \\ 1 & 1 & 1 & 1 \\ 1 & 1 & 1 & 1 \end{bmatrix};$$

$$0 < K_{pmE\,24}^{E} < 1 \text{ and } K_{pmE\,44}^{E} > 1$$

The resulted adaptive model parameter is:

$$E_a = \begin{bmatrix} e_{11} & e_{12} & e_{13} & e_{14} \\ e_{21} & e_{22} & e_{23} & e_{24} \\ e_{31} & e_{32} & e_{33} & e_{34} \\ e_{41} & e_{42} & e_{43} & e_{44} \end{bmatrix} \Rightarrow \begin{bmatrix} e_{11} & e_{12} & e_{13} & e_{14} \\ e_{21} & e_{22} & e_{23} & e_{24} \cdot K_{pmE\,24}^{E} \\ e_{31} & e_{32} & e_{33} & e_{34} \\ e_{41} & e_{42} & e_{43} & e_{44} \cdot K_{pmE\,44}^{E} \end{bmatrix} \Rightarrow$$

$$\begin{bmatrix} e_{11} & e_{12} & e_{13} & e_{14} \\ e_{21} & e_{22} & e_{23} & e_{24} \\ e_{31} & e_{32} & e_{33} & e_{34} \\ e_{41} & e_{42} & e_{43} & e_{44} \end{bmatrix}$$

In case 3 where a known modeling error, the following example assumes that at a very drastic transient condition, the very fast dynamics associated with to neglected in the nominal plant model is identified to have significant adverse impact on outputs $y_2$, $y_3$, and $y_4$ within a certain varying frequency range. The interactions between $u_1$ and $y_2$, $y_3$, and $y_4$ can be zeroed out during the drastic transient phase to preserve the expected control action continuity, particularly when $(u_1, y_1)$ is a dominant pair without sign change of their relation. The interaction between $y_1$ and $u_2$, $u_3$, and $u_4$ can also be zeroed out. In this way, $u_1$ does not impact $y_2$, $y_3$, and $y_4$ while $u_2$, $u_3$, and to are only dependent on $y_2$, $y_3$, and $y_4$ during this very short phase. Assuming that the operating condition transition is from steady state into large transient, then back to steady state, the model adaptive factor array transition is:

$$K_{pmE}^{IO} = \begin{bmatrix} 1 & 1 & 1 & 1 \\ 1 & 1 & 1 & 1 \\ 1 & 1 & 1 & 1 \\ 1 & 1 & 1 & 1 \end{bmatrix} \Rightarrow \begin{bmatrix} 1 & 0 & 0 & 0 \\ 0 & 1 & 1 & 1 \\ 0 & 1 & 1 & 1 \\ 0 & 1 & 1 & 1 \end{bmatrix} \Rightarrow \begin{bmatrix} 1 & 1 & 1 & 1 \\ 1 & 1 & 1 & 1 \\ 1 & 1 & 1 & 1 \\ 1 & 1 & 1 & 1 \end{bmatrix}$$

The resulted adaptive model parameter is:

$$E_a = \begin{bmatrix} e_{11} & e_{12} & e_{13} & e_{14} \\ e_{21} & e_{22} & e_{23} & e_{24} \\ e_{31} & e_{32} & e_{33} & e_{34} \\ e_{41} & e_{42} & e_{43} & e_{44} \end{bmatrix} \Rightarrow \begin{bmatrix} e_{11} & 0 & 0 & 0 \\ 0 & e_{22} & e_{23} & e_{24} \\ 0 & e_{32} & e_{33} & e_{34} \\ 0 & e_{42} & e_{43} & e_{44} \end{bmatrix} \Rightarrow \begin{bmatrix} e_{11} & e_{12} & e_{13} & e_{14} \\ e_{21} & e_{22} & e_{23} & e_{24} \\ e_{31} & e_{32} & e_{33} & e_{34} \\ e_{41} & e_{42} & e_{43} & e_{44} \end{bmatrix}$$

An important distinction between the method of the present invention and the well-known techniques of adaptive model-based control is that the commonly used methods in adaptive model-based control do not adapt the plant model to changes of plant actuators modes, and different actuator changes are treated with different specific approaches, such as, actuators on-limit being treated with gain tuning, which is very difficult in MIMO control case due to the plant inputs and outputs coupling and actuator faults being treated as a specific degraded control mode. Actuators in a quasi-free moving mode have not been addressed for MIMO control. The method of the current invention is a holistic solution which ensures that the actuator modes are adapted into the adaptive plant model such that a model-based control can automatically inherit the changes in the plant actuators mode. By reconfiguring the plant model to adapt to the changes in the actuator current mode and building a model-based control around the reconfigured plant model, the method can isolate constrained actuators from the high priority plant outputs while at the same time, treat the constrained actuators as known disturbance inputs, and assure smooth control transition as the actuators mode is transitioned from constrained to unconstrained so as to resume nominal plant operation.

Technical effects of the system and method disclosed in the embodiments include providing a control system that incorporates a simple, purpose-oriented, deterministic, robust and systematic solution for an adaptive model-based control system having constrained or faulted actuators. The adaptive model-based control system ensures stability and robustness to plant changes and deterministic and robust adaption with a clear control priority purpose by using the adaptive plant model on-line reconfiguration and automatic adaptive model-based control to adapt to plant changes. This allows for constrained actuators to be isolated from the remaining MIMO control system while maximizing the unconstrained actuators capability, and for the control system to return to nominal operating conditions correctly as the actuator is back to unconstrained mode.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of controlling a plant having a plurality of actuators, a plurality of inputs corresponding to an operational state of the actuators and a plurality of outputs associated with at least a subset of the plurality of actuators and corresponding to an operating condition of the plant according to a model-based control and a plant model, the method comprising:
   prioritizing the outputs to define an ordered output priority ranking;
   determining a mode of each of the plurality of actuators to define a plurality of actuator modes, wherein the plurality of actuator modes includes at least an unconstrained mode and a constrained mode;
   building at least one plant model adaptive factor array using the ordered output priority ranking and the actuator modes by decoupling a subset of the plurality of actuators in the constrained mode from respectively associated outputs;
   reconfiguring the plant model in real-time using the at least one plant model adaptive factor array to adapt the plant model to the output priority ranking and actuator modes wherein the subset of the plurality of actuators in the constrained mode are reconfigured to be associated with a corresponding subset of the lower priority outputs in accordance with the ordered output priority ranking; and
   building the model-based control such that the model-based control adapts to the ordered output priority ranking and actuator modes automatically; and operating the plant with the plurality of actuators based on the built model-based control.

2. The method of claim 1, further comprising determining known plant model errors based on the plant operating conditions wherein the at least one plant model adaptive factor array is built further using the known plant model errors.

3. The method of claim 1 wherein the ordered output priority ranking is predetermined.

4. The method of claim 1, further comprising repeating the prioritizing, determining, building at least one plant model, reconfiguring, and building the model-based control.

5. The method of claim 1 wherein the step of building at least one plant model adaptive factor array is done in real-time.

6. The method of claim 1 wherein the model-based control is dynamic inversion control.

7. The method of claim 1 wherein the model-based control is linear-quadratic regulator control.

8. The method of claim 1 wherein the actuator constrained mode is one of an actuator fixed mode or an actuator quasi-free moving mode.

9. The method of claim 8 wherein the step of building the at least one plant model adaptive factor array is dependent on a presence of the actuator fixed mode or the actuator quasi-free moving mode.

10. The method of claim 1, further comprising a step of isolating each of the plurality of actuators having an actuator constrained mode from a higher priority defined by the ordered output priority ranking to define isolated actuators.

11. The method of claim 10, further comprising rejecting the isolated actuators as known disturbance inputs.

12. The method of claim 10, further comprising returning the isolated actuators to the actuator unconstrained mode.

13. The method of claim 12, further comprising integrating the isolated actuators returned to the actuator unconstrained mode with the higher priority in accordance with the ordered output priority ranking.

14. The method of claim 13, further comprising preserving each relation term of isolated input-output pairs of the isolated actuators as initial conditions for the isolated actuators integrating with the higher priority in accordance with the ordered output priority ranking.

15. A controlled system, comprising:
- a plant comprising a plurality of outputs corresponding to operating conditions of the plant and a plurality of actuators associated with at least a subset of the plurality of outputs and having a plurality of inputs corresponding to operational states of the plurality of actuators;
- an output priority ranking module configured to prioritize the plurality of outputs to define an output priority ranking;
- an actuator mode management module configured to determine a mode of each of the plurality of actuators to define a plurality of actuator modes, the plurality of actuator modes including at least an unconstrained mode and a constrained mode;
- a management module configured to build at least one plant model adaptive factor array using the output priority ranking and the actuator modes by decoupling a subset of the plurality of actuators in the constrained mode from respectively associated outputs;
- a plant model module configured to reconfigure a plant model using the at least one plant model adaptive factor array wherein the subset of the plurality of actuators in the constrained mode are reconfigured to be associated with a corresponding subset of the lower priority outputs in accordance with the ordered output priority ranking; and
- a model-based control module configured to build a model-based control that adapts to the output priority ranking and actuator modes automatically and operate the plant with the plurality of actuators based on the built model-based control.

16. The system of claim 15, further comprising a known plant model errors module configured to determine know plant model errors based on the operating conditions of the plant.

17. The system of claim 16 wherein the plant model module is further configured to build the at least one plant model adaptive factor array using the known plant model errors.

* * * * *